(12) United States Patent
Yamagishi et al.

(10) Patent No.: US 7,819,543 B2
(45) Date of Patent: Oct. 26, 2010

(54) OPTICAL UNIT, BACKLIGHT DEVICE, LIQUID CRYSTAL MODULE AND LIQUID CRYSTAL DISPLAY APPARATUS

(75) Inventors: Nobuyoshi Yamagishi, Yokohama (JP); Shigehiro Masuji, Yokohama (JP); Naoto Hirohata, Yokohama (JP); Masahiko Sugiyama, Yokohama (JP)

(73) Assignee: Victor Company of Japan, Ltd., Kanagawa-Ken (JP)

( * ) Notice: Subject to any disclaimer, the term of this patent is extended or adjusted under 35 U.S.C. 154(b) by 27 days.

(21) Appl. No.: 12/380,250

(22) Filed: Feb. 25, 2009

(65) Prior Publication Data
US 2009/0225533 A1    Sep. 10, 2009

(30) Foreign Application Priority Data
Mar. 10, 2008  (JP) .............................. 2008-059437
May 8, 2008    (JP) .............................. 2008-122128

(51) Int. Cl.
*G09F 13/04* (2006.01)
*G09F 13/08* (2006.01)

(52) U.S. Cl. ...................... 362/97.2; 362/331; 362/607; 349/61; 359/621

(58) Field of Classification Search ....... 362/97.1–97.3, 362/331, 607; 359/621; 349/61
See application file for complete search history.

(56) References Cited

U.S. PATENT DOCUMENTS 6,147,802 A   11/2000  Itoh et al. .................... 359/500
6,151,166 A   11/2000  Matsushita et al. .......... 359/566
7,645,057 B2 *  1/2010  Kim et al. .................... 362/335
2009/0129058 A1 *  5/2009  Tokita et al. ............... 362/97.2

FOREIGN PATENT DOCUMENTS

JP       2008-003243        1/2008
JP       2008-046601        2/2008
WO       WO 2007/148815    12/2007

OTHER PUBLICATIONS

European Search Report (Jun. 18, 2009—6 pages).

* cited by examiner

*Primary Examiner*—Stephen F Husar
(74) *Attorney, Agent, or Firm*—Renner, Kenner, Greive, Bobak, Taylor & Weber

(57) ABSTRACT

An optical unit for use in a backlight device of a liquid crystal display apparatus, has a first light-collecting and -diffusing optical component, a light-collecting optical component, and a second light-collecting and -diffusing optical component, provided in this order on the optical path of light emitted from a light source. Each light-collecting and -diffusing optical component has a surface provided on which are a plurality of microlenses each having a shape of a hemisphere- or semi-oval-like protrusion, with light collecting and diffusing functions. The light-collecting optical component has a surface provided on which are a plurality of prisms each having a saw-teeth like section, with a light collecting function. Each surface is provided on a light-emitting side of the optical unit.

11 Claims, 26 Drawing Sheets

| | HALF-INTENSITY ANGLE($\alpha$) FOR 2ND MICROLENS-EQUIPPED OPTICAL SHEET | | | | | | | | | | |
|---|---|---|---|---|---|---|---|---|---|---|---|
| | | 2 | 5 | 7 | 8 | 10 | 15 | 20 | 25 | 26 | 27 | 30 |
| HALF-INTENSITY ANGLE($\alpha$) FOR 1ST MICROLENS-EQUIPPED OPTICAL SHEET | 1 | | | | c | c | c | c | c | | | |
| | 2 | b | b | c | d | e | e | e | d | c | b | b |
| | 5 | b | b | c | d | e | e | e | d | c | b | b |
| | 10 | b | b | c | d | e | e | e | d | c | b | b |
| | 15 | b | b | c | d | e | e | e | d | c | b | b |
| | 16 | | | | c | c | c | c | c | | | |
| | 18 | | | | b | b | b | b | b | | | |
| | 20 | | | | a | a | b | b | b | | | |

LEVEL OF LUMINANCE NON-UNIFORMITY
a>b>c>d>e

FIG. 18

|  | HALF-INTENSITY ANGLE(α) FOR 2ND MICROLENS-EQUIPPED OPTICAL SHEET | | | | | | | | | | |
|---|---|---|---|---|---|---|---|---|---|---|---|
|  |  | 2 | 5 | 7 | 8 | 10 | 15 | 20 | 25 | 26 | 27 | 30 |
| HALF-INTENSITY ANGLE(α) FOR 1ST MICROLENS-EQUIPPED OPTICAL SHEET | 1 |  |  |  | 0.99 | 0.95 | 0.92 | 0.85 | 0.81 |  |  |  |
| | 1.5 |  |  |  | 0.90 | 0.85 | 0.81 | 0.72 | 0.66 |  |  |  |
| | 2 | 0.86 | 0.75 | 0.69 | 0.51 | 0.49 | 0.47 | 0.50 | 0.59 | 0.64 | 0.75 | 0.81 |
| | 5 | 0.86 | 0.77 | 0.68 | 0.53 | 0.50 | 0.46 | 0.49 | 0.56 | 0.65 | 0.77 | 0.85 |
| | 10 | 0.84 | 0.78 | 0.67 | 0.52 | 0.50 | 0.48 | 0.50 | 0.59 | 0.66 | 0.81 | 0.89 |
| | 15 | 0.88 | 0.81 | 0.67 | 0.52 | 0.50 | 0.49 | 0.50 | 0.59 | 0.68 | 0.83 | 1.02 |
| | 16 |  |  |  | 1.02 | 1.01 | 1.00 | 0.69 | 0.65 |  |  |  |
| | 18 |  |  |  | 1.40 | 1.35 | 1.30 | 1.10 | 0.76 |  |  |  |
| | 20 |  |  |  | 1.60 | 1.50 | 1.40 | 0.91 | 0.79 |  |  |  |

OPTICAL UNIT, BACKLIGHT DEVICE, LIQUID CRYSTAL MODULE AND LIQUID CRYSTAL DISPLAY APPARATUS

CROSS-REFERENCE TO RELATED APPLICATIONS

This application is based on and claims the benefit of priority from the prior Japanese Patent Application No. 2008-059437 filed on Mar. 10, 2008 and No. 2008-122128 filed on May 8, 2008, the entire contents of which is incorporated herein by reference.

BACKGROUND OF THE INVENTION

The present invention relates to an optical unit, a backlight device, a liquid crystal module and a liquid crystal display apparatus, with improvements on luminance non-uniformity.

Liquid crystal display apparatuses have rapidly penetrated into markets, equipped with a larger display screen thanks to the recent advancement of technology. There is also a higher demand for a thinner frame so that liquid crystal display apparatuses can be installed anywhere.

Another higher demand is an improvement on luminance non-uniformity highly noticeable in larger display screens, mainly due to non-uniform luminance distribution of light of a backlight device that illuminates a liquid crystal display panel.

An improvement on luminance non-uniformity for a larger display screen is described, for example, in Japanese Unexamined Patent Publication No. 2008-3234 (referred to as Citation 1, hereinafter).

In Citation 1, a direct backlight device is installed just under or behind the back of a liquid crystal display panel, for illuminating the display panel.

A backlight device 101 of Citation 1 is equipped, as shown in FIG. 26, with light sources 102, a reflecting plate 103 and an optical unit 104. The light sources 102 are aligned on the reflecting plate 103.

The optical unit 104 consists of a light diffusing plate 105, a first light diffusing sheet 106, a light collecting sheet 107, a second light diffusing sheet 108, formed in this order from the light source's side. The first and second light diffusing sheets 106 and 108 have a transparent sheet base and a light diffusing surface formed on a light-emitting side of the sheet base. The light diffusing surface is applied with light diffusing particles. The light collecting sheet 107 is a prism sheet having a transparent sheet base and multiple prisms having a light collecting function, arranged on a light-emitting side of the sheet base.

The light components emitted from the light sources 102 are diffused by the light diffusing plate 105 and the first light diffusing sheet 106 and then collected by the light collecting sheet 107 while being diffracted in a direction orthogonal to the sheet 107. The collected light components are then emitted from the sheet 107, with enhanced luminance in a certain range of view angle. The light emitted from the sheet 107 is incident on the second light diffusing sheet 108 to undergo diffusion to have a lower level of luminance non-uniformity.

A thinner liquid crystal display apparatus requires a shorter distance H (referred to as optical-unit distance H, hereinafter) between the center of each light source 102 and the light diffusing plate 105, when it employs the backlight device 101 of Citation 1.

A typical optical-unit distance H is about 15 mm in known liquid crystal display apparatuses.

An experiment with the known backlight device 101 revealed that an optical-unit distance H shorter than 15 mm causes a bigger difference in luminance between the section just above (in front of) the light sources 102 and the other sections. Such a difference in luminance results in periodic luminance non-uniformity of illuminating light emitted from the backlight device 101, over a liquid crystal display panel.

One solution to such a problem is providing additional several optical sheets to the optical unit 104, which, however, causes cost-up and decrease in luminance.

Another solution to such a problem is providing more light sources 102 while maintaining sufficient luminance. Providing more light sources 102, however, leads to increase in circuit components in a driver for the liquid crystal display panel, such as an inverter, which results in cost-up and higher power consumption.

Further experiments with the known backlight device 101 revealed that the above two solutions improve uniformity of luminance for illuminating light emitted in a direction orthogonal to the backlight device 101 whereas do not improve uniformity of luminance sufficiently for illuminating light emitted in the other directions.

More optical sheets and/or light sources 102 are required to improve uniformity of luminance for illuminating light emitted in the other directions discussed above. An increase in number of the optical sheets causes decrease in total luminance. Moreover, an increase in the number of the light sources 102 leads to increase in circuit components, which results in cost-up and higher power consumption, as discussed above. Therefore, both are not practical solutions.

SUMMARY OF THE INVENTION

A purpose of the present invention is to provide an optical unit, a backlight device, a liquid crystal module, and a liquid crystal display apparatus that achieve sufficient luminance for a thin liquid crystal display panel with a short distance between light sources and an optical unit, with a lower level of luminance non-uniformity.

Another purpose of the present invention is to provide an optical unit, a backlight device, a liquid crystal module, and a liquid crystal display apparatus that achieve a lower level of luminance non-uniformity in the direction orthogonal to a backlight device and also oblique directions.

The present invention provides an optical unit for use in a backlight device of a liquid crystal display apparatus, comprising: a first light-collecting and -diffusing optical component having a surface provided on which are a plurality of microlenses each having a shape of a hemisphere- or semi-oval-like protrusion, having light collecting and diffusing functions; a light-collecting optical component having a surface provided on which are a plurality of prisms each having a saw-teeth like section, having a light collecting function; and a second light-collecting and -diffusing optical component having a surface provided on which are a plurality of microlenses each having a shape of a hemisphere- or semi-oval-like protrusion, having light collecting and diffusing functions, wherein the first light-collecting and -diffusing optical component, the light-collecting optical component, and the second light-collecting and -diffusing optical component are provided in this order on an optical path of light emitted from a light source of the backlight device, each surface being provided on a light-emitting side of the optical unit.

Moreover, the present invention provides a backlight device 5 comprising: an optical unit; a light source; and a reflecting plate that is provided so that the light source is located between the optical unit and the reflecting plate, wherein the optical unit includes: a first light-collecting and -diffusing optical component having a surface provided on which are a plurality of microlenses each having a shape of a hemisphere- or semi-oval-like protrusion, having light collecting and diffusing functions; a light-collecting optical component having a surface provided on which are a plurality of prisms each having a saw-teeth like section, having a light collecting function; and a second light-collecting and -diffusing optical component having a surface provided on which are a plurality of microlenses each having a shape of a hemisphere- or semi-oval-like protrusion, having light collecting and diffusing functions, wherein the first light-collecting and -diffusing optical component, the light-collecting optical component, and the second light-collecting and -diffusing optical component are provided in this order on an optical path of light emitted from the light source, each surface being provided on a light-emitting side of the optical unit.

Furthermore, the present invention provides a liquid crystal module comprising: a liquid crystal panel; and a backlight device including: an optical unit; a light source; and a reflecting plate that is provided so that the light source is located between the optical unit and the reflecting plate, wherein the optical unit includes: a first light-collecting and -diffusing optical component having a surface provided on which are a plurality of microlenses each having a shape of a hemisphere- or semi-oval-like protrusion, having light collecting and diffusing functions; a light-collecting optical component having a surface provided on which are a plurality of prisms each having a saw-teeth like section, having a light collecting function; and a second light-collecting and -diffusing optical component having a surface provided on which are a plurality of microlenses each having a shape of a hemisphere- or semi-oval-like protrusion, having light collecting and diffusing functions, wherein the first light-collecting and -diffusing optical component, the light-collecting optical component, and the second light-collecting and -diffusing optical component are provided in this order on an optical path of light emitted from the light source, each surface being provided on a light-emitting side of the optical unit, and the liquid crystal panel is provided so that the optical unit is located between the light source and the liquid crystal panel.

Moreover, the present invention provides a liquid crystal display apparatus comprising: a liquid crystal module; and a driver for driving the liquid crystal module, wherein the liquid crystal module includes a liquid crystal panel and a backlight device having: an optical unit; a light source; and a reflecting plate that is provided so that the light source is located between the optical unit and the reflecting plate, wherein the optical unit includes: a first light-collecting and -diffusing optical component having a surface provided on which are a plurality of microlenses each having a shape of a hemisphere- or semi-oval-like protrusion, having light collecting and diffusing functions; a light-collecting optical component having a surface provided on which are a plurality of prisms each having a saw-teeth like section, having a light collecting function; and a second light-collecting and -diffusing optical component having a surface provided on which are a plurality of microlenses each having a shape of a hemisphere- or semi-oval-like protrusion, having light collecting and diffusing functions, wherein the first light-collecting and -diffusing optical component, the light-collecting optical component, and the second light-collecting and -diffusing optical component are provided in this order on an optical path of light emitted from the light source, each surface being provided on a light-emitting side of the optical unit, and the liquid crystal panel is provided so that the optical unit is located between the light source and the liquid crystal panel.

BRIEF DESCRIPTION OF DRAWINGS

FIG. 18 shows the results of evaluation of samples of the backlight device shown in FIG. 16 on luminance non-uniformity by visual inspection at an angle of 0 degrees in FIG. 17;

FIG. 19 shows the results of evaluation of samples of the backlight device shown in FIG. 16 on luminance non-uniformity with a two-dimensional luminance colorimeter at an angle of 0 degrees in FIG. 17;

DETAILED DESCRIPTION OF PREFERRED EMBODIMENTS

In the following disclosure and throughout the drawings, the same or analogous elements or components are given the same numerals or signs, overlapping description being omitted if not necessary.

Figure 1:
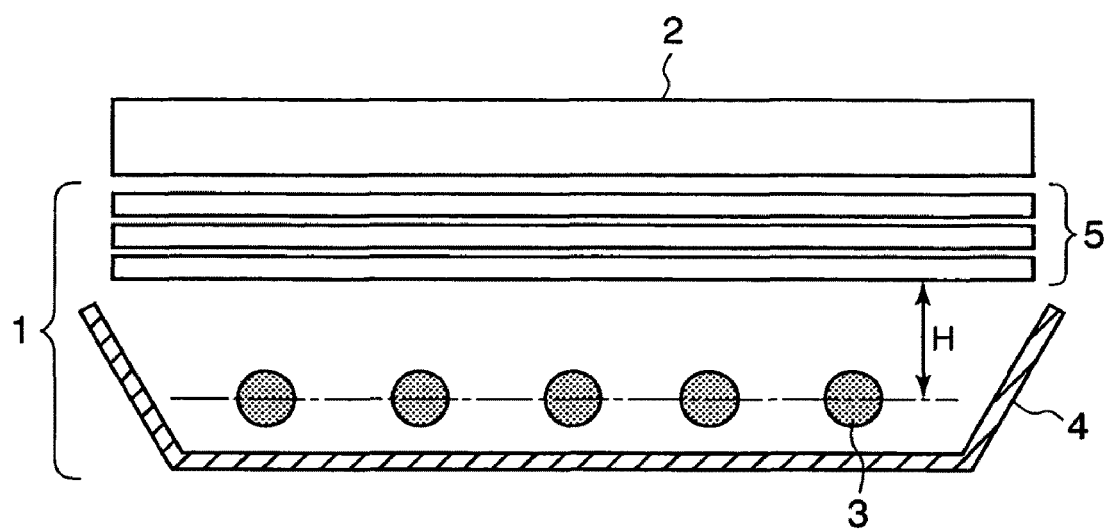
FIG. 1 shows a sectional view of a basic structure of a backlight device, according to the present invention, for illuminating a liquid crystal panel.

FIG. 1 shows a sectional view of a basic structure of a backlight device 1, according to the present invention, for illuminating a liquid crystal display panel 2.

As shown in FIG. 1, the backlight device 1 is equipped with: light sources 3, a reflecting plate 4 that reflects light emitted in a direction opposite to the liquid crystal display panel 2 to make the light return to the display panel 2; and an optical unit 5, provided between the light sources 3 and the panel 2, having several plate- or sheet optical components that function to improve a display performance of the display panel 2.

First Embodiment of Optical Unit

Figure 2:
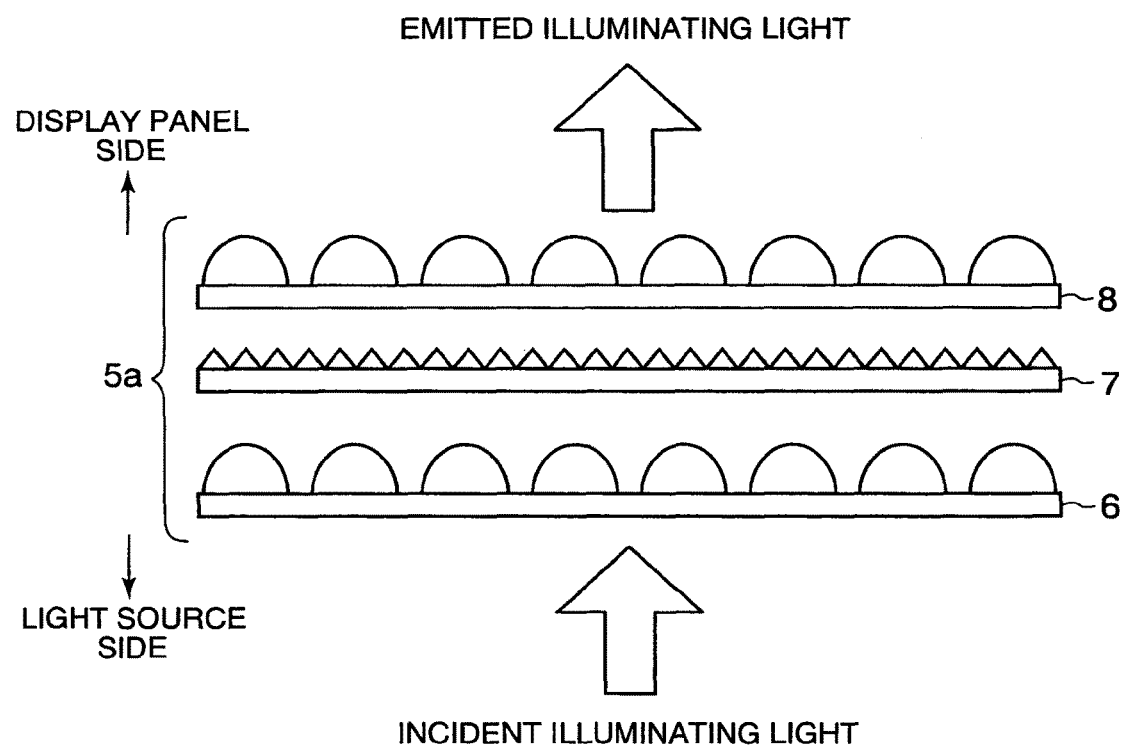
FIG. 2 shows an exploded sectional view of a first embodiment of an optical unit according to the present invention.

Described first is an optical unit 5a shown in FIG. 2 that achieves a lower level of luminance non-uniformity of light emitted to the liquid crystal display panel 2 (FIG. 1).

The term "luminance non-uniformity" is defined as in-plane non-uniformity of luminance of light emitted to a display zone of the liquid crystal display panel 2, in the present invention.

As shown in FIG. 2, the optical unit 5a is equipped with: a first microlens-equipped optical sheet 6; a prism-equipped light collecting sheet 7 having prisms formed on a light collecting surface thereof; and a second microlens-equipped optical sheet 8, provided in this order between the light sources 3 and the liquid crystal panel 2 (FIG. 1). The optical unit 5a is separated from the light sources 3 with a specific optical distance H.

Figure 3:
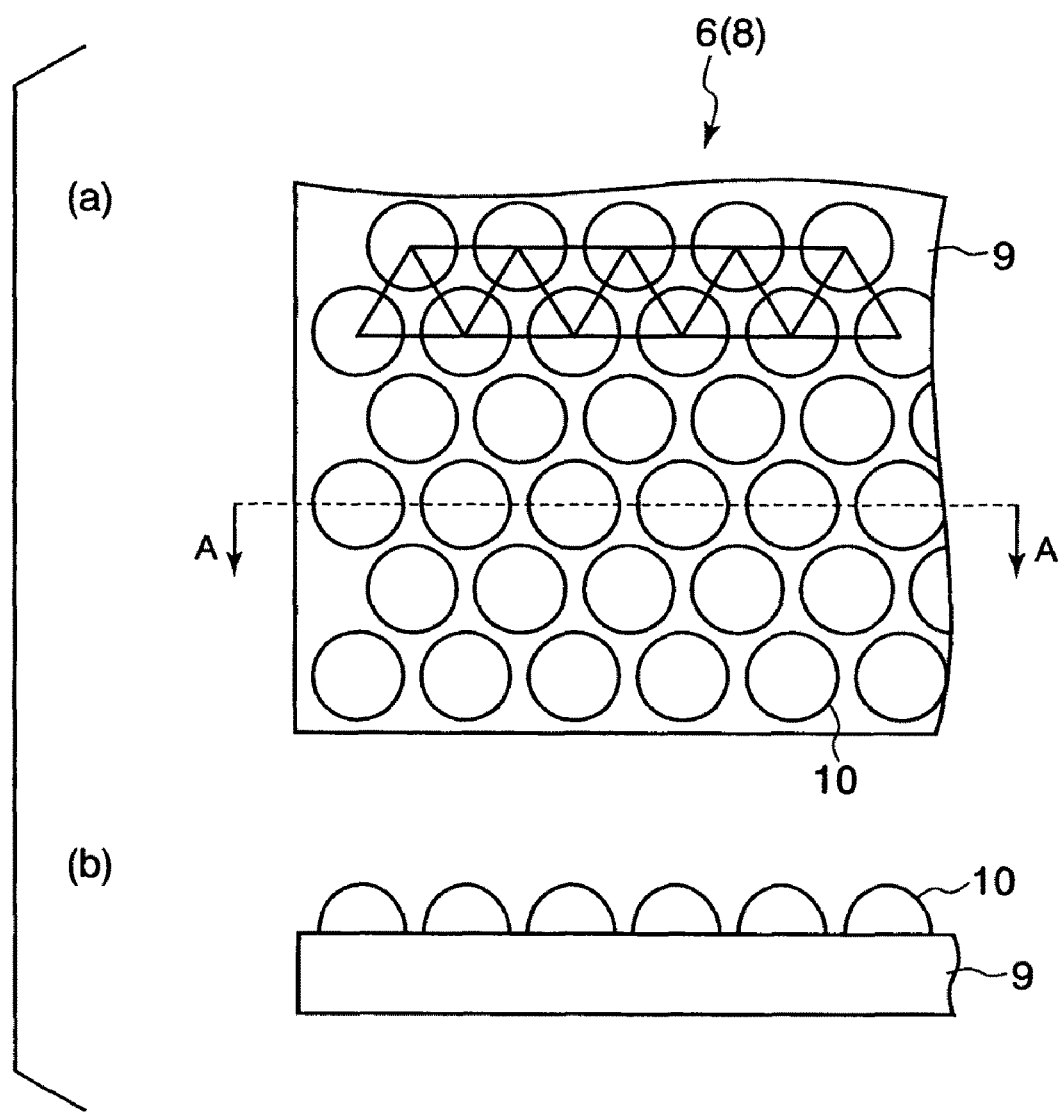
FIG. 3 shows a microlens-equipped optical sheet used in an optical unit according to the present invention, in which (a) shows a partial plan view of the optical sheet and (b) shows a partial sectional view of the optical sheet, taken on line A-A in (a)

As shown in (a) and (b) of FIG. 3, the first and second microlens-equipped optical sheets 6 and 8 are provided with multiple microlenses 10 two-dimensionally arranged on the light-emitting side of a sheet base 9. Each microlens 10 has a shape of a hemisphere- or semi-oval-like protrusion.

The base 9 and the microlenses 10 are made of a material that exhibits high transmittance to allow incident light to pass therethrough. The material may be applied with a diffusing agent for control of light distribution. Moreover, the base 9 and the microlenses 10 are preferably made of the same material that can restrict reflection at the interface therebetween due to difference in refractive index, which otherwise occurs if different materials are used.

The first and second microlens-equipped optical sheets 6 and 8 have several optical functions, such as, light collection, reflection in a direction of the normal line of each sheet and diffusion.

The microlenses 10 are preferably tightly arranged on the sheet base 9 with almost no gaps therebetween for maximum light collecting and diffusion functions.

A preferable arrangement of the microlenses 10 is a grid pattern, as shown in (a) of FIG. 3, in which imaginary lines connected to the summits of each set of three microlenses 10 form an equilateral triangle.

Figure 4:
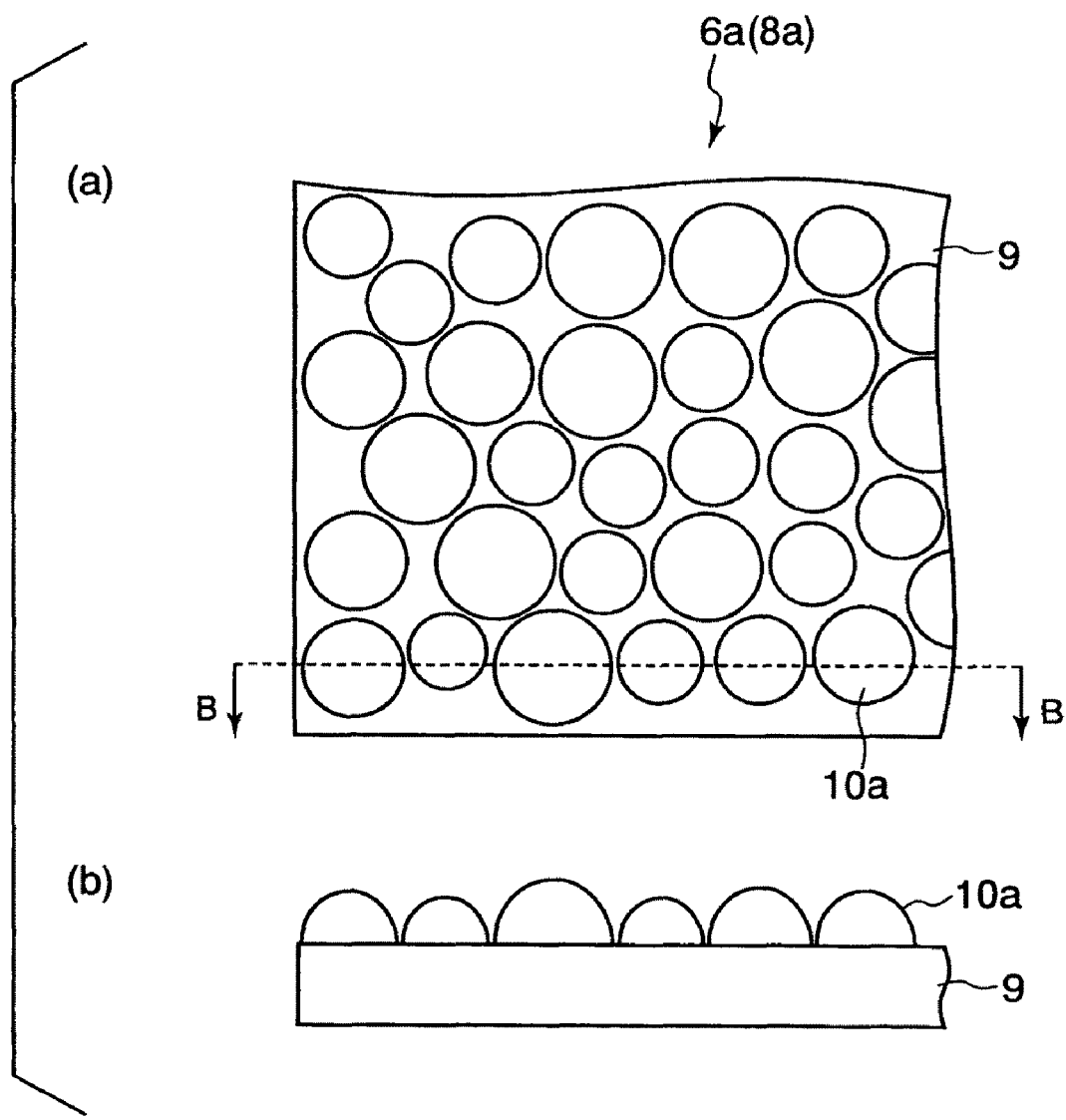
FIG. 4 shows a modification to the microlens-equipped optical sheet shown in FIG. 3, in which (a) shows a partial plan view of the modified optical sheet and (b) shows a partial sectional view of the modified optical sheet, taken on line B-B in (a)

A more preferable arrangement of the microlenses is that, as shown in (a) of FIG. 4, microlenses 10a of microlens-equipped optical sheets 6a and 8a have different diameters for their surfaces that touch the base 9, when viewed from the light-emitting side of the microlenses 10a. This arrangement has a random grid pattern of imaginary lines connected to the summits of the adjoining microlenses 10a, which prevents a moiré pattern from being observed due to the laminated structure of the microlens-equipped optical sheets 6a and 8a, the same as the first and second microlens-equipped optical sheets 6 and 8, to the other optical components, as shown in FIGS. 1 and 2.

The arrangement of the microlenses 10 may be the same or different for the first and second microlens-equipped optical sheets 6 and 8.

Figure 5:
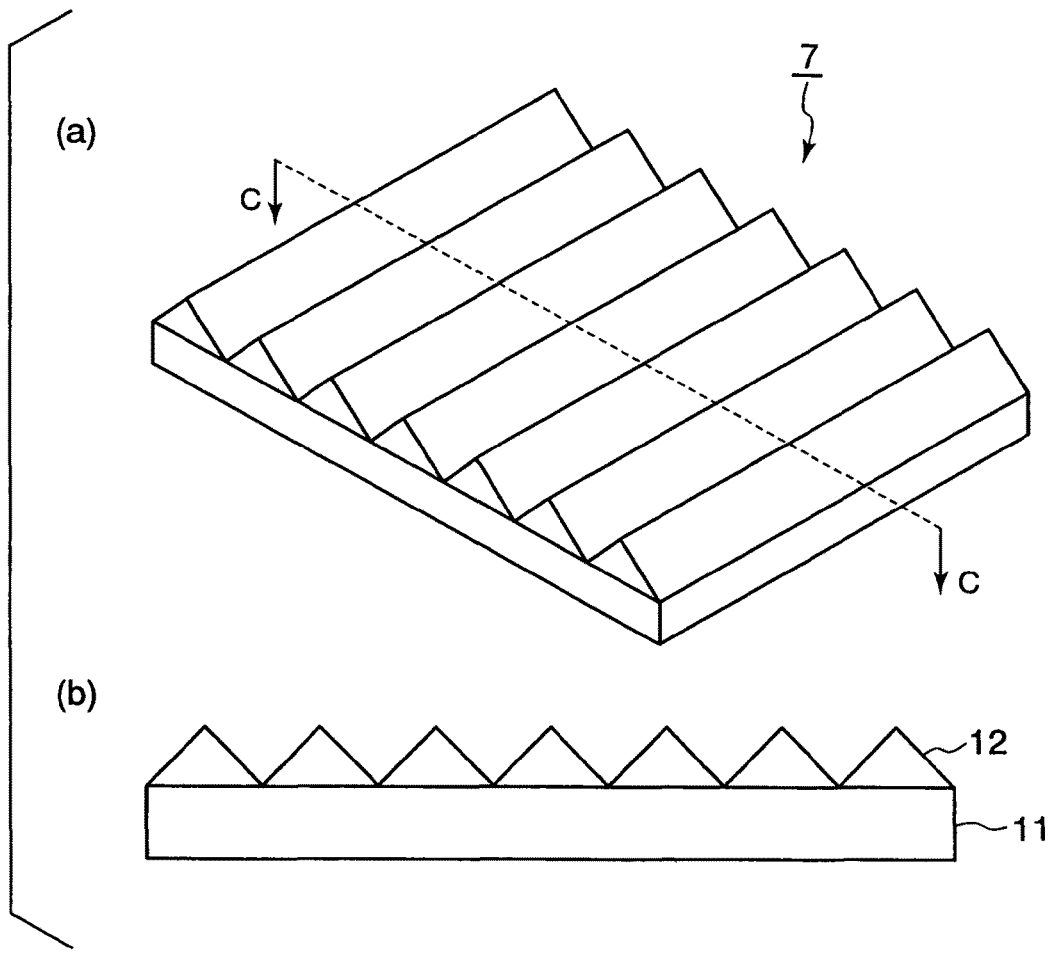
FIG. 5 shows a microlens-equipped optical sheet used in an optical unit according to the present invention, in which (a) shows a partial perspective view of the optical sheet and (b) shows a partial sectional view of the optical sheet, taken on line C-C in (a)

Next, as shown in (a) and (b) of FIG. 5, the prism-equipped light collecting sheet 7 has multiple prisms 12 that are formed as being parallel to one another with a constant interval for their summits and protruding from the light-emitting side of a sheet base 11. Each prism 12 has a section like the teeth of a saw. The prisms 12 have triangles at their sections, as shown in (b) of FIG. 5, taken on line c-c shown in (a) of FIG. 5. Moreover, the prisms 12 are formed such that the triangles are continuously provided on the base 11 as forming a V-shaped bottom between adjoining triangles with no gaps therebetween.

The light components incident on the prism-equipped light collecting sheet 7 are collected by the sheet 7 in the direction orthogonal to the sheet 7 while being diffracted by the prisms 12.

As for such a light collecting function, the prism-equipped light collecting sheet 7 is made of a material that exhibits high transmittance because it requires to allow light to pass therethrough, like the first and second microlens-equipped optical sheets 6 and 8, as shown in FIG. 2.

Moreover, the sheet base 11 and the prisms 12 formed on the base 11 are preferably made of the same material so that no reflection can occur due to the difference in reflective index at their interface, which otherwise occurs if different materials are used.

Discussed next is the optical path for the light, emitted from each light source 3 (FIG. 1), that passes through the optical unit 5a (FIG. 2).

The tube-like light sources 3 of the backlight device 1 shown in FIG. 1 are known light sources, which cause a higher level of luminance non-uniformity and variation in the angle of incidence of light on the light-incident surface of the optical unit 5a due to the locations of the light sources 3, the difference in light directly incident on the optical unit 5a and light incident thereon after reflected by the reflecting plate 4, etc.

The optical unit 5a equipped with the first microlens-equipped optical sheet 6, the prism-equipped light collecting sheet 7, and the second microlens-equipped optical sheet 8, formed as described above, has the following function.

Among illuminating light components emitted from the light sources 3 and suffering from the luminance non-uniformity and variation in the angle of incidence: the light components each incident at a specific angle are allowed to pass through the first microlens-equipped optical sheet 6 in the direction towards the liquid crystal display panel 2 while being collected by the light collecting sheet 7; whereas the other light components are reflected by the prisms 10 for several times when incident on the first optical sheet 6, and then returned to the direction towards the light sources 3.

In detail, the light components each incident on the first microlens-equipped optical sheet 6 at the specific angle are allowed to pass therethrough and incident on the prism-equipped light collecting sheet 7. The light components incident on the light collecting sheet 7 are collected as being diffracted in the direction orthogonal to the sheet 7 and emitted therefrom. The light components emitted from the light collecting sheet 7 are then incident on the second microlens-equipped optical sheet 8 and emitted therefrom towards the liquid crystal display panel 2, as collected illuminating light components with a lower level of luminance non-uniformity.

As an option, a diffusing plate may be provided between the light sources 3 and the first microlens-equipped optical sheet 6, for diffusing the incident light.

Second Embodiment of Optical Unit

Described next is an optical unit 5b shown in FIG. 6 that also achieves a lower level of luminance non-uniformity of light emitted to the liquid crystal panel 2 (FIG. 1).

The optical unit 5b is equipped with the first microlens-equipped optical sheet 6, the prism-equipped light collecting sheet 7, the second microlens-equipped optical sheet 8, identical to those of the optical unit 5a (FIG. 2), and a prism-equipped diffusing plate 13 between the light sources 3 (FIG. 1) and the optical sheet 6.

Figure 7:
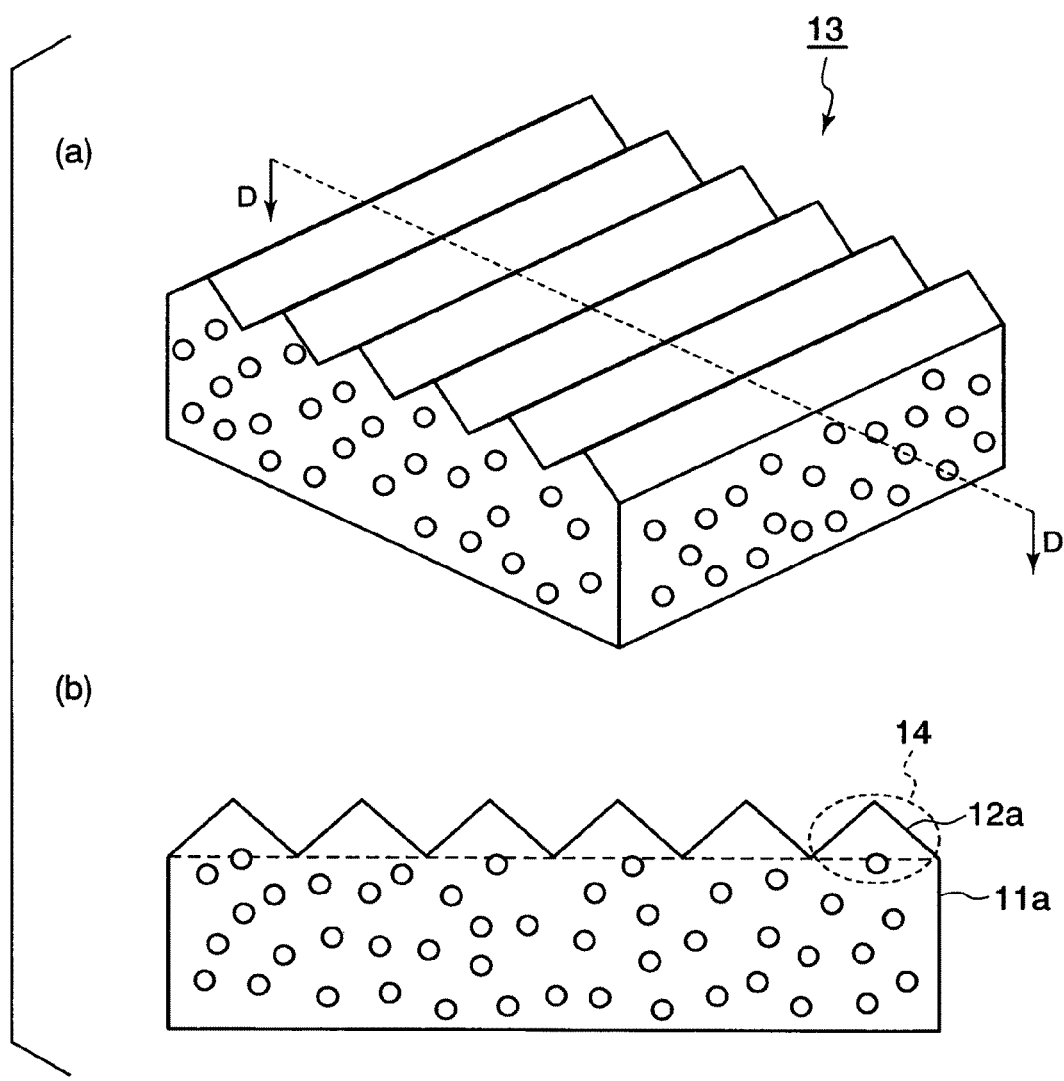
FIG. 7 shows a prism-equipped diffusing plate used in an optical unit according to the present invention, in which (a) shows a partial perspective view of the diffusing plate and (b) shows a partial sectional view of the diffusing plate, taken on line D-D in (a)

As shown in (a) and (b) of FIG. 7, the prism-equipped diffusing plate 13 has multiple prisms integrally formed on the light-emitting surface of a sheet base 11a.

The prism-equipped diffusing plate 13 is made of a material that is a transparent resin with a light diffusing agent dispersed in the resin or a mixture of at least two types of resin which are hardly mixed with each other. The transmittance and haze level of the diffusing plate 13 can be easily adjusted by varying the amount of the light diffusing agent or the mixture ratio of the resins. The diffusing plate 13 made of such material achieves uniformity of luminance by diffusing the light emitted from the light sources 3 and also the light reflected by the reflecting plate 4 (FIG. 4).

Prism sections 14 of the prism-equipped diffusing plate 13, each indicated by a dot-line circle in (b) of FIG. 7, have multiple prisms 12a, each having a cross section like the teeth of a saw, like the prism-equipped light collecting sheet 7 (FIG. 5), formed as being parallel to one another with a constant interval for their summits and protruding from the light-emitting side of the sheet base 11a.

The prism-equipped light diffusing plate 13 is made of a material that exhibits high transmittance because it requires to allow light to pass therethrough. Moreover, the prisms 12a are integrally formed on the sheet base 11a to restrict reflection which otherwise occurs due to the difference in reflective index at their interface.

The illuminating light emitted from the light sources 3 (FIG. 1) and incident on the prism-equipped light diffusing plate 13 are diffused in the sheet base 11a the and then incident on the prism sections 14.

Among the illuminating light components incident on the prism sections 14: the light components each incident at a specific angle are collected while being diffracted in the direction orthogonal to the prism-equipped light diffusing plate 13 and emitted from the prism sections 14 in the direction towards the liquid crystal display panel 2; whereas the other light components are reflected by the prism sections 14 for several times, returned to the sheet base 11a to undergo diffraction again, and emitted in the direction to towards the light sources 3.

Each light component incident on the corresponding prism section 14 at the specific angle is emitted from the prism-equipped light diffusing plate 13 in the direction towards the liquid crystal display panel 2 at an angle closer to the direction orthogonal to the display panel 2, with a lower level of luminance non-uniformity, compared to when it is incident on the diffusing plate 13.

The light component emitted from the prism-equipped light diffusing plate 13 are then emitted from the optical unit 5b towards the liquid crystal display panel 2 via the first microlens-equipped optical sheet 6, the prism-equipped light collecting sheet 7, and the second microlens-equipped optical sheet 8, thus enjoying a lower level of luminance non-uniformity than those emitted from the optical unit 5a (FIG. 2), the first embodiment of the optical unit.

Moreover, due to the light collecting function of the prisms 12a and 12 of the prism-equipped light diffusing plate 13 and the prism-equipped light collecting sheet 7, respectively, the light component are uniformly emitted from the optical unit 5b 10 in the direction towards the liquid crystal display panel 2 even though incident on the optical unit 5b at a wide range of angle of incidence.

Therefore, the second embodiment of the optical unit achieves a shorter optical-unit distance H between the center of 15, the tube-like light sources 3 and the prism-equipped light diffusing plate 13 of the optical unit 5b than the known optical unit 104 (FIG. 26) concerning the luminance non-uniformity, thus offering a thinner backlight device 1 and also a thinner liquid crystal display apparatus.

Third Embodiment of Optical Unit

Described next is an optical unit 5c shown in FIG. 8 that also achieves a lower level of luminance non-uniformity of light emitted to the liquid crystal panel 2 (FIG. 1).

The optical unit 5c is equipped with the prism-equipped diffusing plate 13, the first microlens-equipped optical sheet 6, the prism-equipped light collecting sheet 7, the second microlens-equipped optical sheet 8, identical to those of the optical unit 5*b* (FIG. 6), with a third microlens-equipped optical sheet 15 and a polarization splitting sheet 31, laminated in this order.

Figure 6:
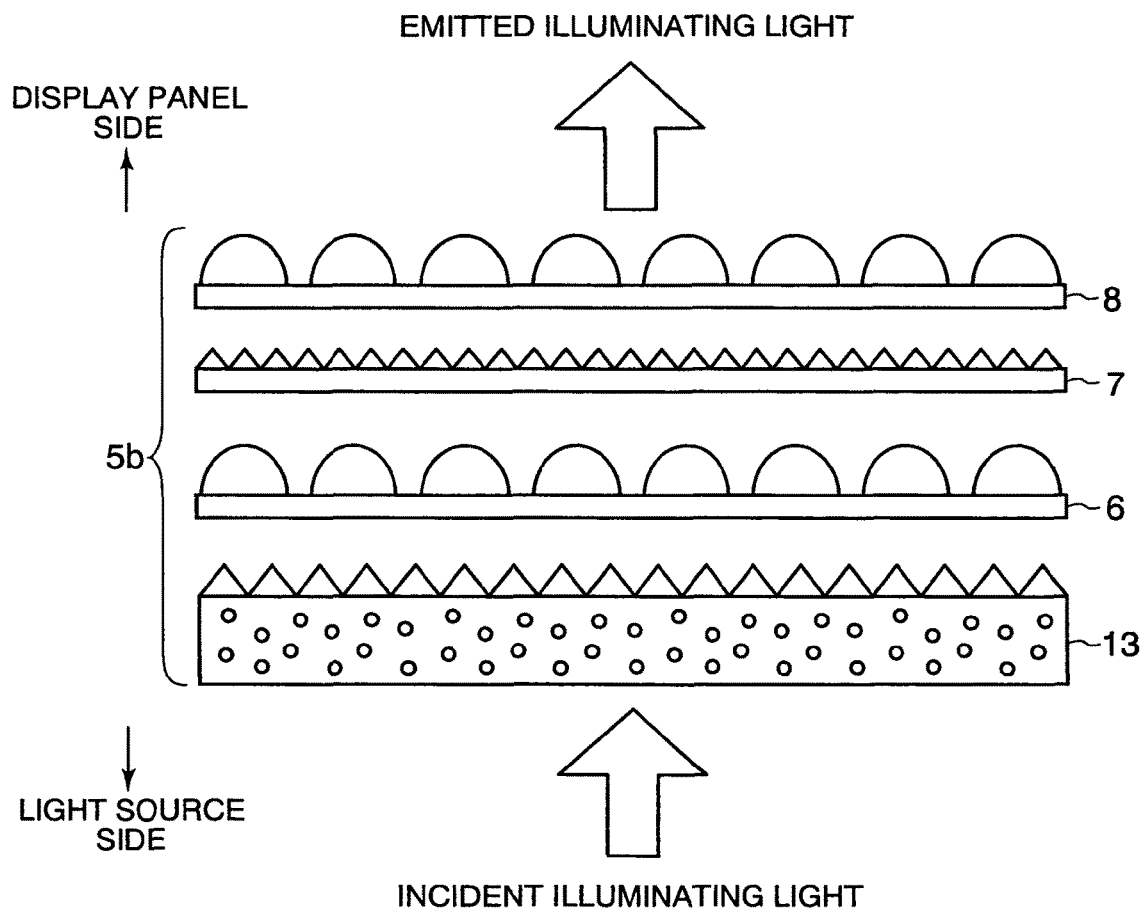
FIG. 6 shows an exploded sectional view of a second embodiment of an optical unit according to the present invention.

Although achieving a lower level of luminance non-uniformity, the optical unit 5*b* (the second embodiment of the optical unit) could exhibit lower luminance and higher angular dependence of luminance, due to the existence of the prism-equipped diffusing plate 13 and the multiple prisms 12 and 12*a* as shown in FIGS. 6 and 7.

In order to solve such problems, the optical unit 5*c* is equipped with the third microlens-equipped optical sheet 15 and the polarization splitting sheet 31 in addition to the optical components identical to those of the optical unit 5*b*.

The polarization splitting sheet 31 has a function of providing higher luminance with lower angular dependence by selectively reflecting polarized components of the incident illuminating light, which could otherwise be absorbed by a polarization film of the liquid crystal display panel 2 (FIG. 1) located the light source side of the panel 2. Such function can be achieved with the light interference property of the polarization splitting sheet 31.

When the illuminating light emitted from the second microlens-equipped optical sheet 8, as described with reference to FIG. 6, is incident on the third microlens-equipped optical sheet 15, unwanted light components are retuned to the optical components 15 to 13 and undergo again the light collection and diffusion.

The illuminating light components that are allowed to be emitted from the third microlens-equipped optical sheet 15 are incident on the polarization splitting sheet 31. Among the incident light components, P-polarized components usable at the liquid crystal display panel 2 are allowed to be emitted to the panel 2 whereas unusable S-polarized components are reflected in the direction of the light sources 3 (FIG. 1).

The S-polarized components returned in the direction of the light sources 3 undergo diffusion through the optical components 15 to 13 and then variation in the polarization direction when reflected by the reflecting plate 4 (FIG. 1).

The light components reflected by the reflecting plate 4 are incident on the polarization splitting sheet 31 again via the optical components 13 to 15. Among the light components incident on the sheet 31, P-polarized components are only allowed to be emitted to the liquid crystal display panel 2.

As described above, the unusable S-polarized components reflected once by the third microlens-equipped optical sheet 15 can also be used by the liquid crystal display panel 2, thus higher light utilization being achieved.

Moreover, the light components emitted from the third microlens-equipped optical sheet 15 are P-polarized components and thus the most of them can be used by the liquid crystal display panel 2, for higher luminance in a display zone of the panel 2.

Figure 9:
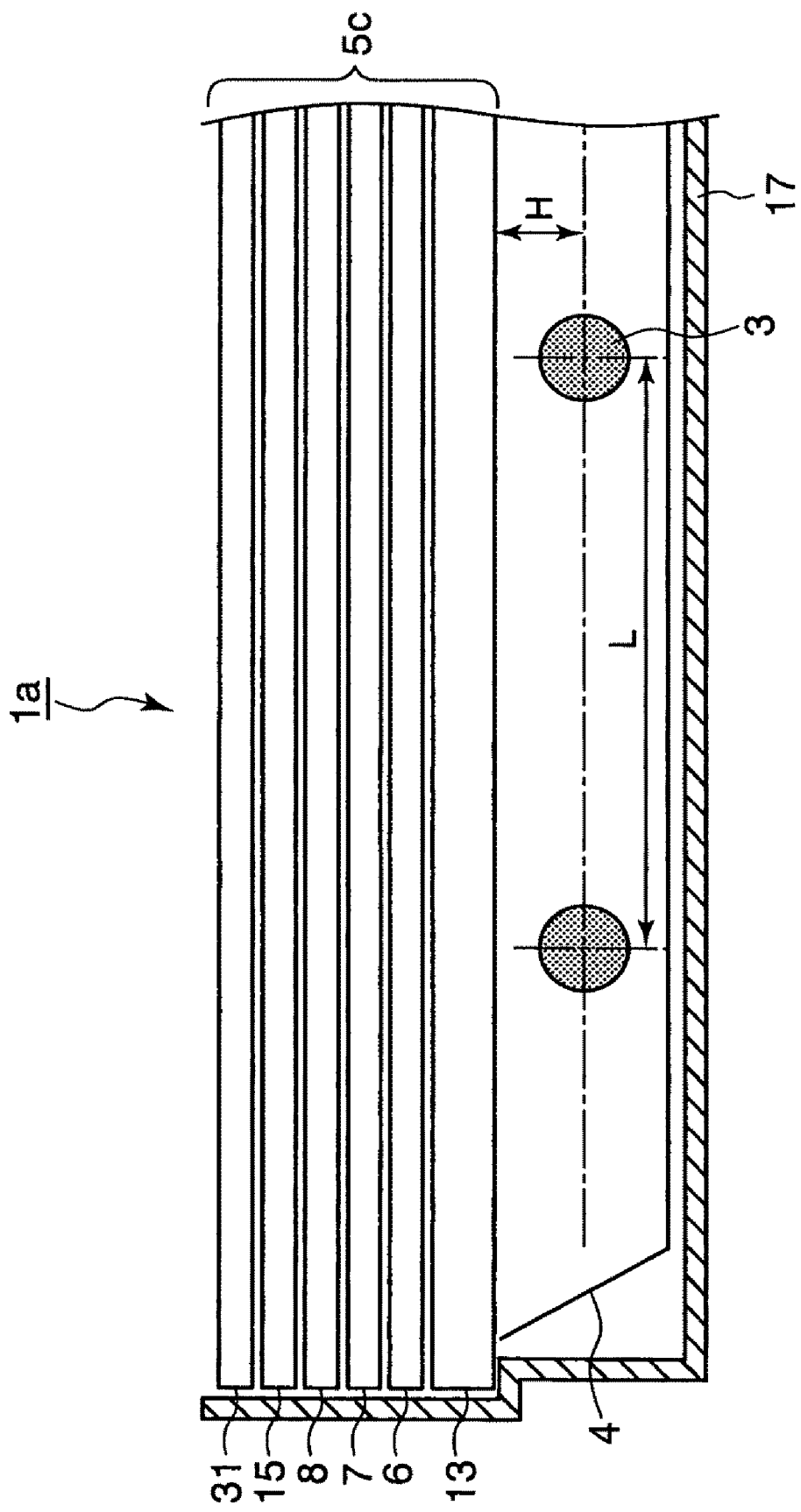
FIG. 9 shows a partial sectional view of a backlight device employing the optical unit shown in FIG. 8, according to the present invention.

Described next is a backlight device 1*a* that employs the optical unit 5*c* (the third embodiment of the optical unit) with reference to FIG. 9 showing a partial sectional view of the device 1*a*.

In FIG. 9, the backlight device 1*a* having a flat rectangular shape is equipped with: the tube-like light sources 3; the optical unit 5*c* that achieves a higher optical performance for the illuminating light emitted from the light sources 3 with a lower level of luminance non-uniformity; the reflecting plate 4 that reflects light components of the illuminating light emitted from the light sources 3, that are emitted in a direction opposite to the optical unit 5*c*, to make the light components return to the unit 5*c*; and a metal sheet 17 that supports the tube-like light sources 3, the reflecting plate 4 and the optical unit 5*c*.

Provided in the backlight device 1*a* as each tube-like light source 3 is a cold cathode fluorescent lamp (CCFL) that is a compact fluorescent lamp with a smaller diameter of about 3 mm.

The light sources 3 are separated from one another by 24 mm in distance L, each having 5 mm in optical-unit distance H from its center to the bottom surface of the optical unit 5*c*.

The reflecting plate 4 has a white front face with a flat surface that faces the light sources 3 and side faces formed as being inclined to the optical unit 5*c* to guide light components emitted in the lateral direction from the light sources 3 to the optical unit 5*c*.

As described with reference to FIG. 8, the optical unit 5*c* is equipped with the prism-equipped diffusing plate 13, the first microlens-equipped optical sheet 6, the prism-equipped light collecting sheet 7, the second microlens-equipped optical sheet 8, the third microlens-equipped optical sheet 15, and the polarization splitting sheet 31, laminated in this order.

The prism-equipped diffusing plate 13 used in the backlight device 1*a* has a thickness of 2 mm, with multiple prisms having a vertical angle of 100 degrees with a pitch of 70 μm therebetween.

The first, second and third microlens-equipped optical sheets 6, 8 and 15 used in the backlight device 1*a* have multiple microlenses, like shown in FIG. 4, with a thickness of 200 μm, a diameter of 40 to 80 μm, and a height of 20 to 40 μm.

The prism-equipped diffusing plate 13 used in the backlight device 1*a* has multiple prisms formed as being parallel to the tube-like light sources 3 in the longitudinal direction that is orthogonal to line D-D in (a) of FIG. 7.

The prism-equipped light collecting sheet 7 used in the backlight device 1*a* have a thickness of 280 μmm, with multiple prisms having a vertical angle of 90 degrees with a pitch of 50 μm therebetween. The prisms of the light collecting sheet 7 are also formed as parallel to the tube-like light sources 3 in the longitudinal direction that is orthogonal to line D-D in (a) of FIG. 7.

The polarization splitting sheet 31 used in the backlight device 1*a* have a thickness of 400 μmm, with a function of allowing incident P-polarized beam components to pass therethrough whereas reflecting incident S-polarized beam components.

Discussed next with reference to FIGS. 10 to 13 are an evaluation method for the backlight device 1*a* on angular dependence of luminance and results of the evaluation.

The angular dependence of luminance was examined only on the plane of the backlight device 1*a* cut in the transversal direction orthogonal to the cross section of the tube-like light sources 3, not on the plane in the longitudinal direction parallel to the cross section of the light sources 3 due to no effects of the luminance non-uniformity in this direction.

Figure 10:
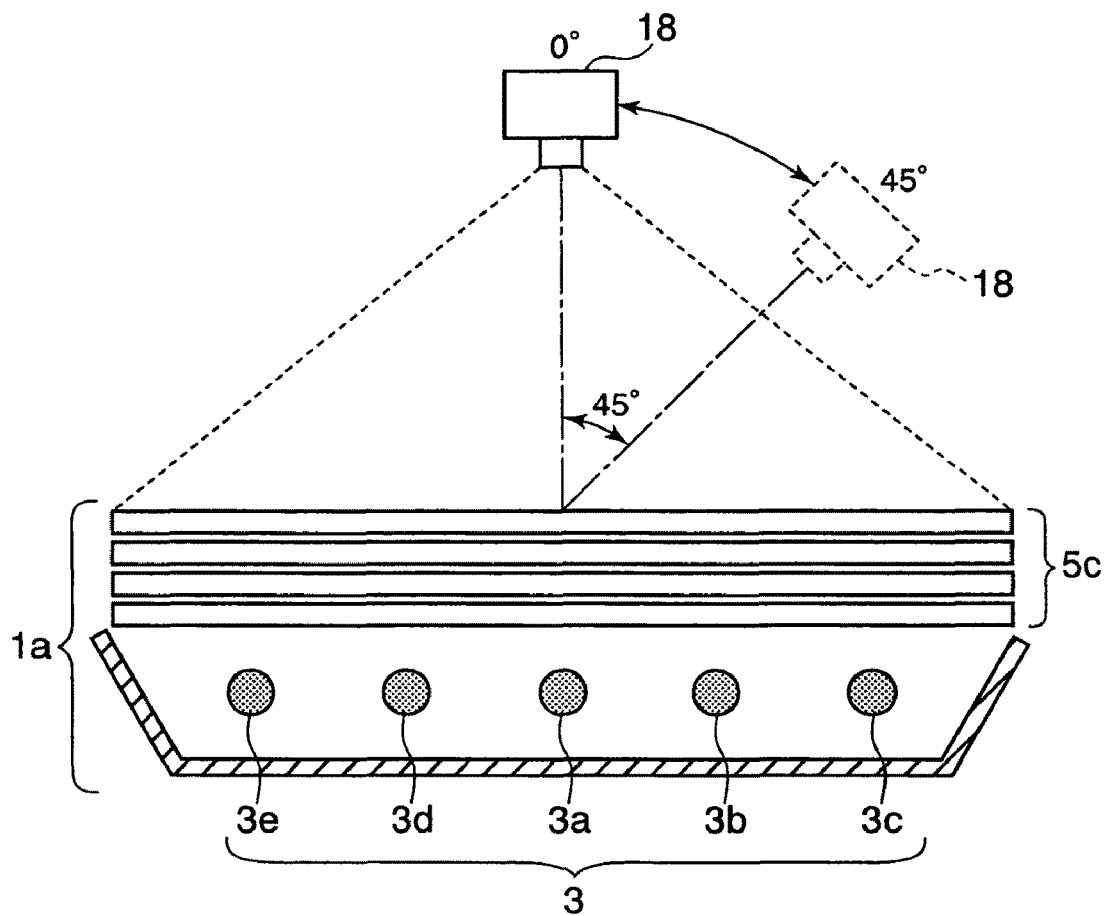
FIG. 10 shows a view illustrating examination of angular dependence of luminance in the backlight device shown in FIG. 9, according to the present invention.

FIG. 10 illustrates examination of the angular dependence of luminance.

In FIG. 10, a two-dimensional luminance calorimeter 18 was set in front of the optical unit 5*c* of the backlight device 1*a*, with an angle of 0 degrees at which the luminance colorimeter 18 was positioned as orthogonal to the light-emitting plane of the backlight device 1*a*.

The angular dependence of luminance was examined with the two-dimensional luminance colorimeter 18 positioned at the angle of 0 degrees and also at an angle of 45 degrees inclined in the transversal direction of the backlight device 1*a*.

The two-dimensional luminance colorimeter 18 is an instrument to two-dimensionally examine luminance non-uniformity, chromaticity, etc., on the plane to be examined for flat panel displays and backlight devices. The instrument used in the examination was a ProMetic 1400 made by Radiant Imaging Inc.

Figure 26:
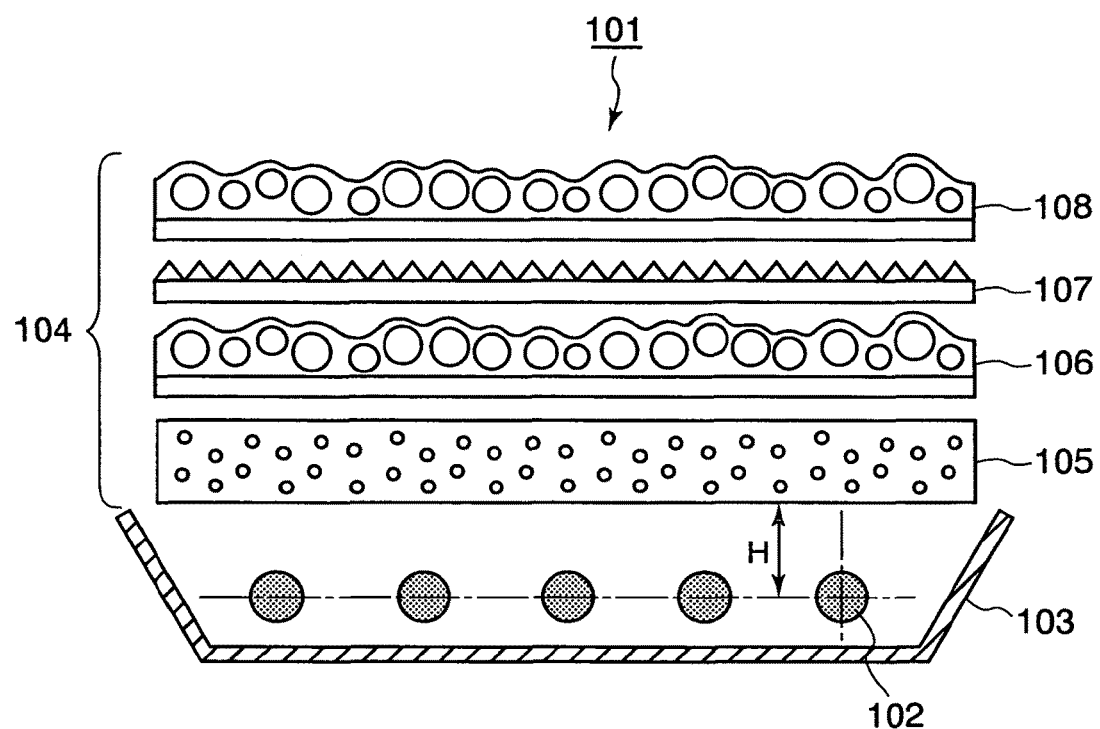
FIG. 26 shows a sectional view of a known backlight device.

Also examined was the angular dependence of luminance in the known backlight device 101, shown in FIG. 26, assembled as a thinner device with a modification to the optical-unit distance H from the known distance of 15 mm to 5 mm.

The light sources 3 and 102 of the backlight device 1a of the present invention and the known backlight device 101, respectively, used in the evaluation were the same number of identical light sources with the same 24 mm in distance L (FIG. 9) and the same 5 mm in optical-unit distance H.

Figure 11:
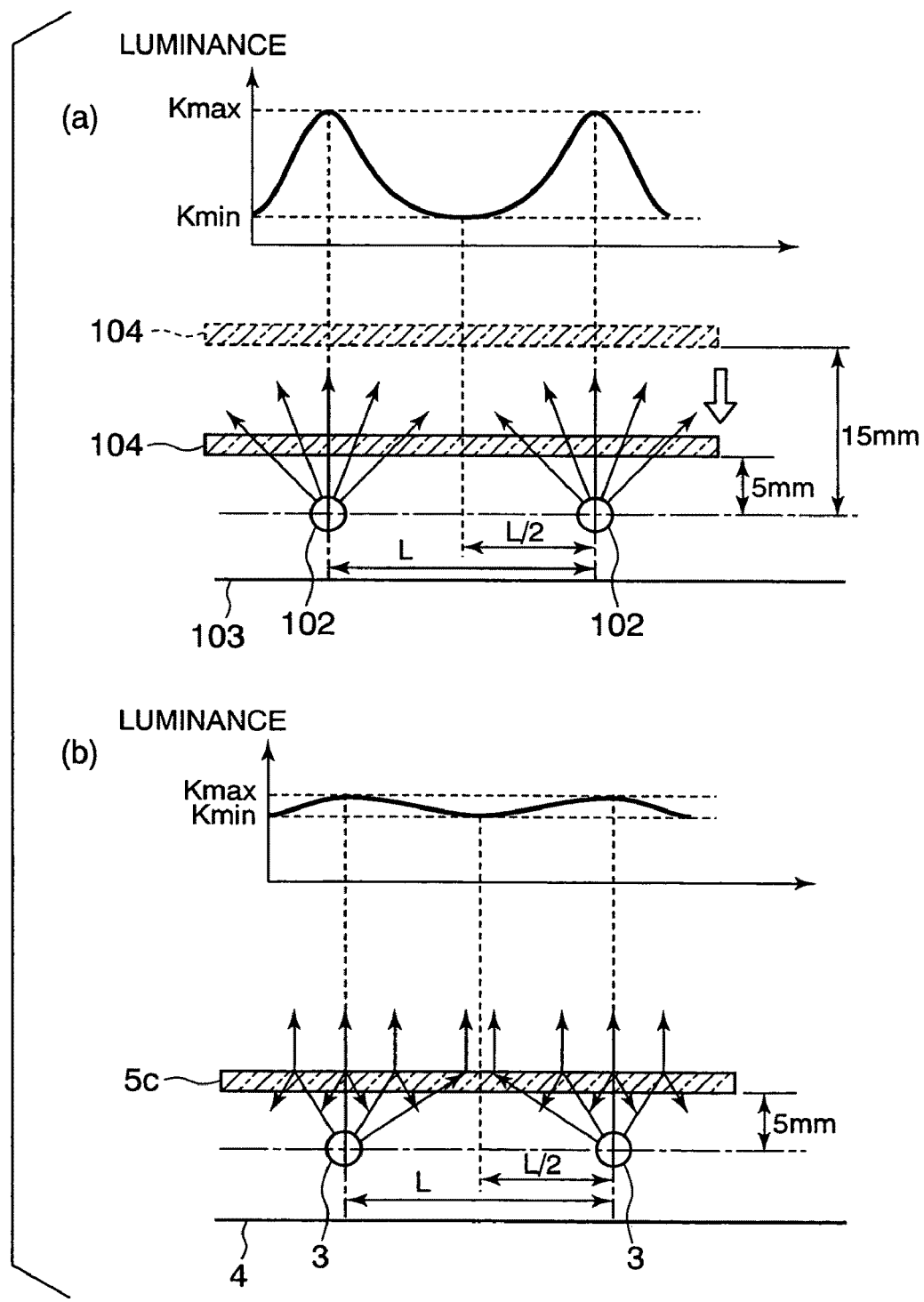
FIG. 11 shows views illustrating luminance non-uniformity, in which (a) and (b) illustrate luminance non-uniformity in a known backlight device and the backlight device shown in FIG. 9 of the present invention, respectively.

Illustrated in (a) of FIG. 11 is the luminance measured in the known backlight device 101 at the angle of 0 degrees as shown in FIG. 10.

The backlight device 101 assembled as having the optical-unit distance H of 5 mm for the optical unit 104 closer to the light sources 102 than the known distance H of 15 mm exhibited a higher level of luminance non-uniformity (Kmax-Kmin), the difference between the maximum luminance Kmax and the minimum luminance Kmin of illuminating light emitted from the optical unit 104.

In the evaluation, the maximum luminance Kmax and the minimum luminance Kmin were measured at a first position just above (orthogonal to the center of) each light source 3 (102) and a second position corresponding to the middle position of 12 mm (L/2) between the adjoining light sources 3 (102), respectively.

Illustrated in (b) of FIG. 11 is the luminance measured in the backlight device 1a of the present invention at the angle of 0 degrees as shown in FIG. 10.

It is understood from FIG. 11 that, compared to the known backlight device 101, the backlight device 1a exhibited a lower level of luminance non-uniformity (Kmax-Kmin).

In detail, at the first position just above (orthogonal to the center of) each light source, the backlight device 1a of the present invention exhibited a lower luminance than the known backlight device 101, due to reflection, diffusion, etc.

In contrast, as the measured position was closer to the second position corresponding to the middle position of L/2 between the adjoining light sources, the backlight device 1a of the present invention enjoyed a higher light utility (incident light/emitted light) and hence a higher luminance than the known backlight device 101.

Figure 12:
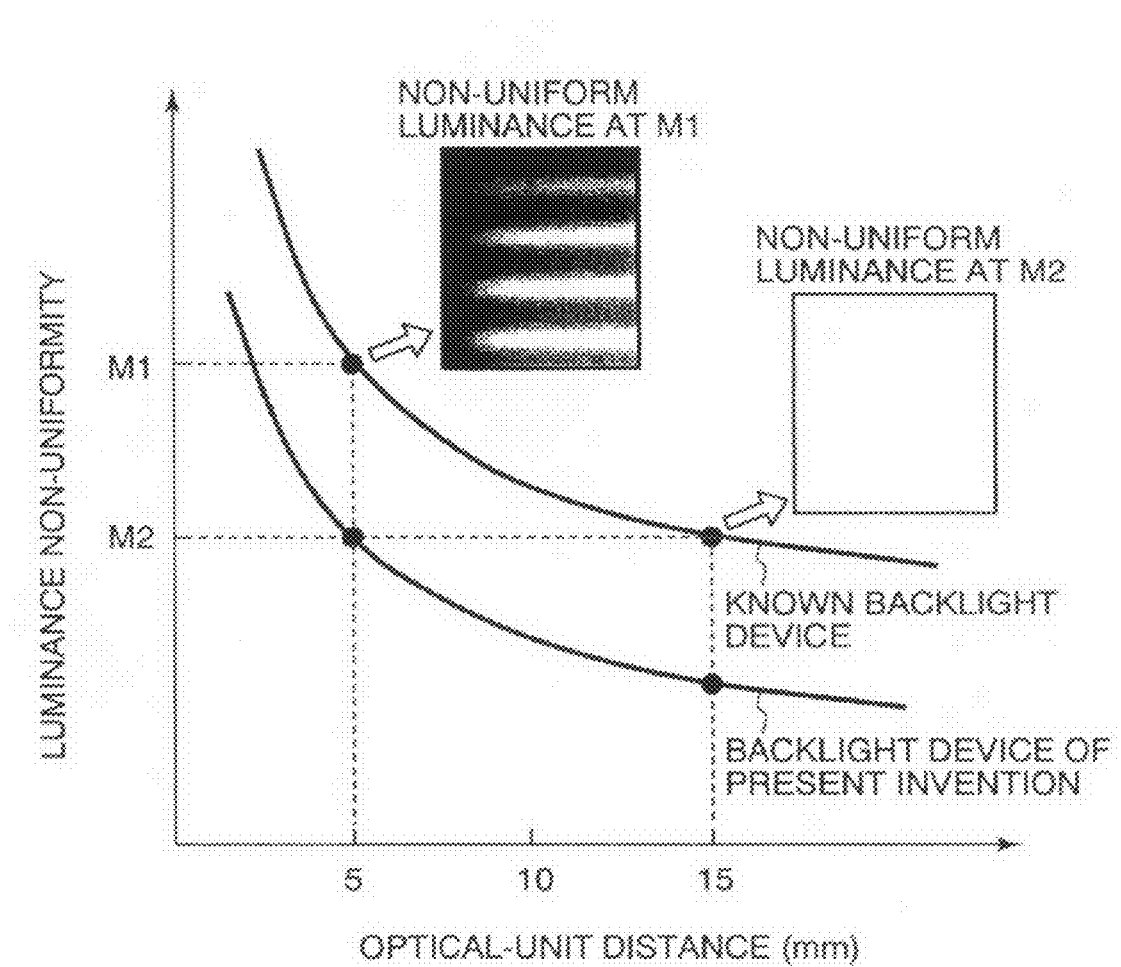
FIG. 12 shows a graph indicating luminance non-uniformity depending on an optical-unit distance in the known backlight device and the backlight device shown in FIG. 9 of the present invention.

Discussed further with reference to FIG. 12 is the luminance non-uniformity depending on the optical-unit distance H in the known backlight device 101 and the backlight device 1a of the present invention.

In the graph of FIG. 12, the ordinate indicates the optical-unit distance H and the abscissa indicates the luminance non-uniformity (Kmax-Kmin), the higher on the abscissa, the higher the level of luminance non-uniformity.

The graph of FIG. 12 shows that the known backlight device 101 and the backlight device 1a of the present invention exhibited almost the same lower level (M2) of luminance non-uniformity when the backlight devices 101 and 1a were adjusted to have the optical-unit distance H of 15 mm and 5 mm, respectively. However, the backlight device 101 exhibited a higher level (M1) of luminance non-uniformity when adjusted to have the optical-unit distance H of 5 mm.

In addition, photographs shown along the curves indicate constant distribution of luminance at the level M2 with a lower level of luminance non-uniformity whereas a stripe of black and white at the level M1 with a higher level of luminance non-uniformity, the white bright portions corresponding to the positions of the light sources 103.

Figure 13:
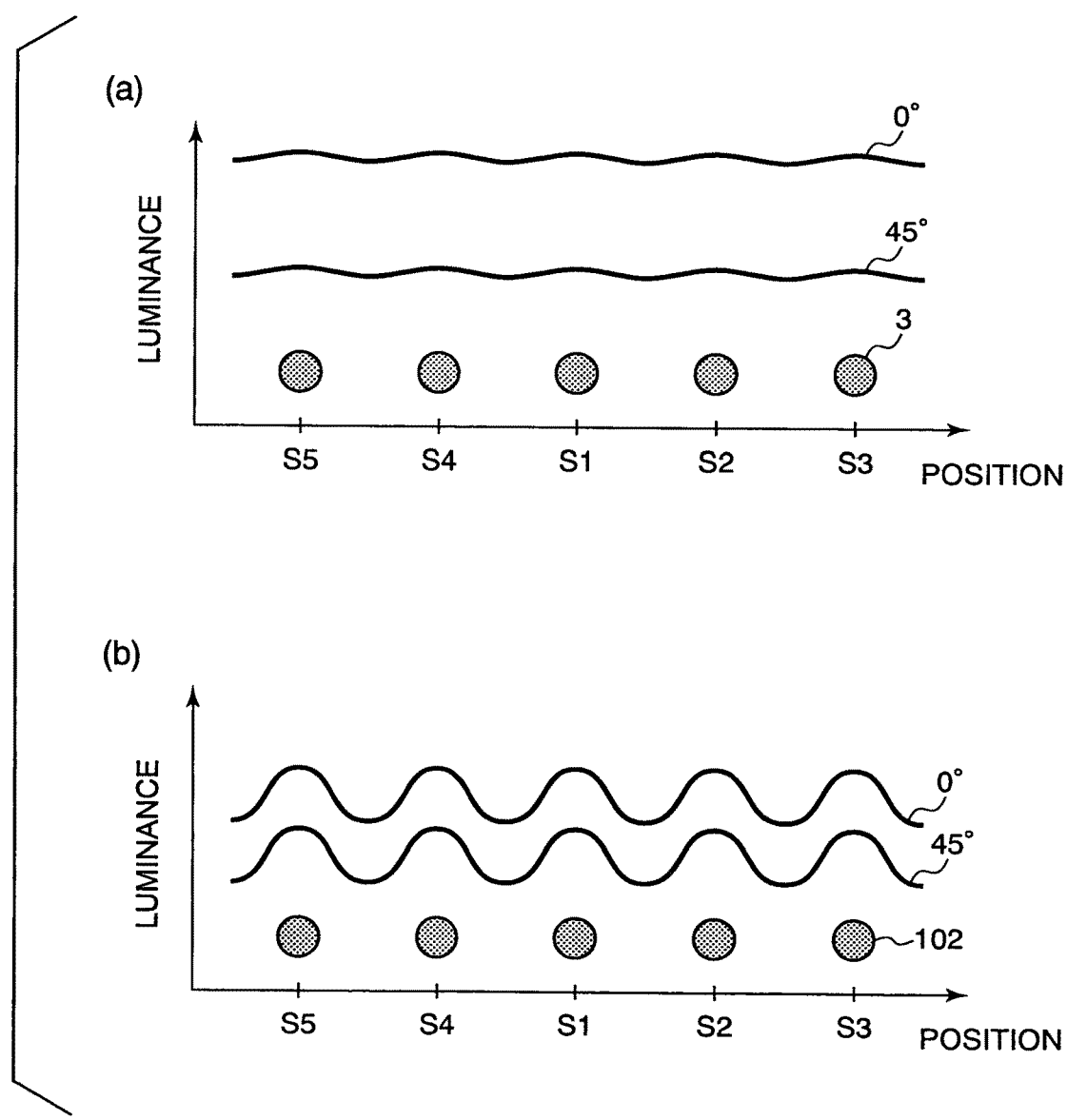
FIG. 13 shows graphs indicating angular dependency of luminance, in which (a) and (b) indicate angular dependency of luminance in the backlight device shown in FIG. 9 of the present invention and the known backlight device, respectively.

Discussed next with reference to FIG. 13 is the angular dependency of luminance.

Shown in (a) of FIG. 13 is the distribution of luminance measured by the two-dimensional luminance calorimeter 18 (FIG. 10) set in front of the optical unit 5c of the backlight device 1a (with the optical-unit distance H of 5 mm) at the angles of 0 and 45 degrees.

Shown in (b) of FIG. 13 is the distribution of luminance measured by the two-dimensional luminance calorimeter 18 set in front of the optical unit 104 of the known backlight device 101 (with the optical-unit distance H of 5 mm) at the angles of 0 and 45 degrees.

The ordinate in (a) of FIG. 13 indicates the positions of planes of the backlight device 1a cut in the transversal direction that is orthogonal to the light sources 3, with a point S1 corresponding to the position of a light source 3a with which the two-dimensional luminance colorimeter 18 faces at the angle of 0 degrees and points S2, S3, S4 and S5 corresponding to the positions of light sources 3b, 3c, 3d and 3e, respectively, shown in FIG. 10. The abscissa in (a) of FIG. 13 indicates luminance measured by the luminance calorimeter 18. The same is applied to the ordinate and abscissa in (b) of FIG. 13.

FIG. 13 teaches that: the backlight device 1a of the present invention exhibited a lower level of luminance non-uniformity at both of the angles of 0 and 45 degrees; whereas the known backlight device 101 exhibited a higher level of luminance non-uniformity at both of the angles of 0 and 45 degrees due to a shorter optical-unit distance H of 5 mm adjusted as same as the backlight device 1a.

Fourth Embodiment of Optical Unit

Figure 14:
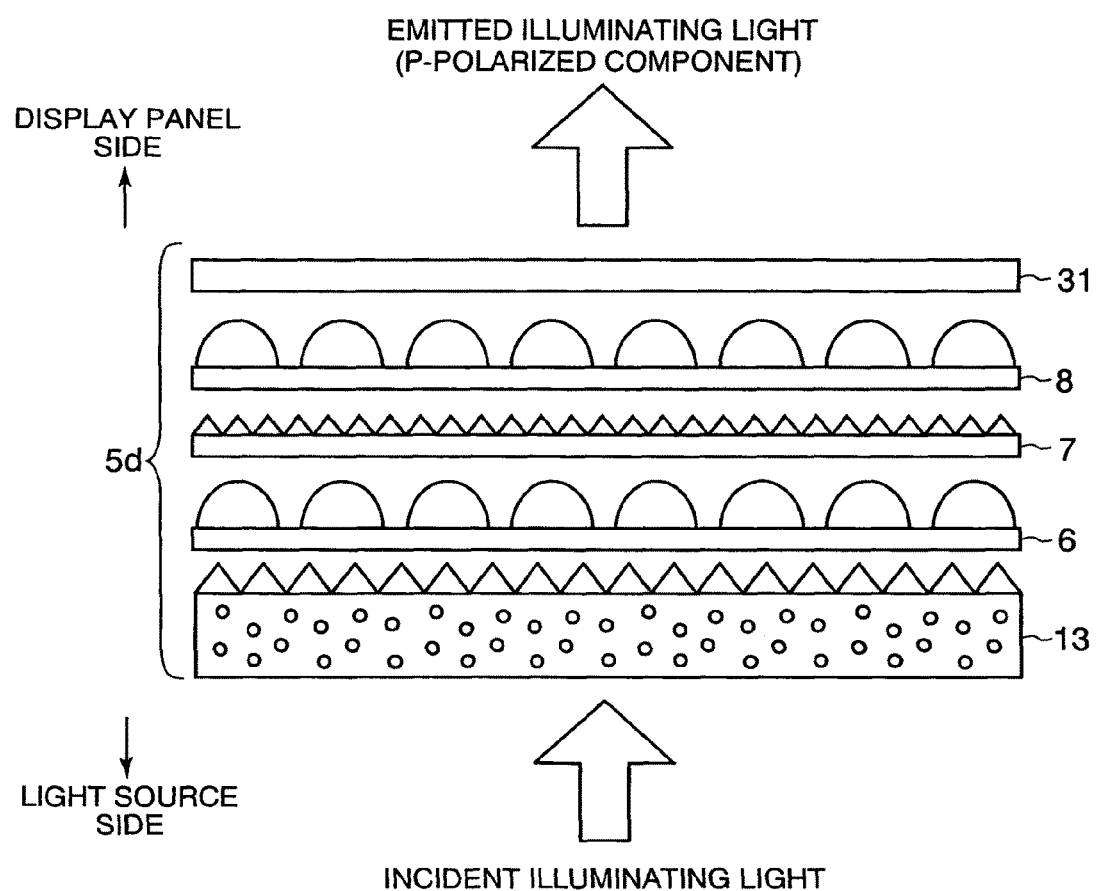
FIG. 14 shows an exploded sectional view of a fourth embodiment of an optical unit according to the present invention.

Described next is an optical unit 5d shown in FIG. 14 that achieves a lower level of luminance non-uniformity of light emitted to the liquid crystal panel 2 (FIG. 1).

Figure 8:
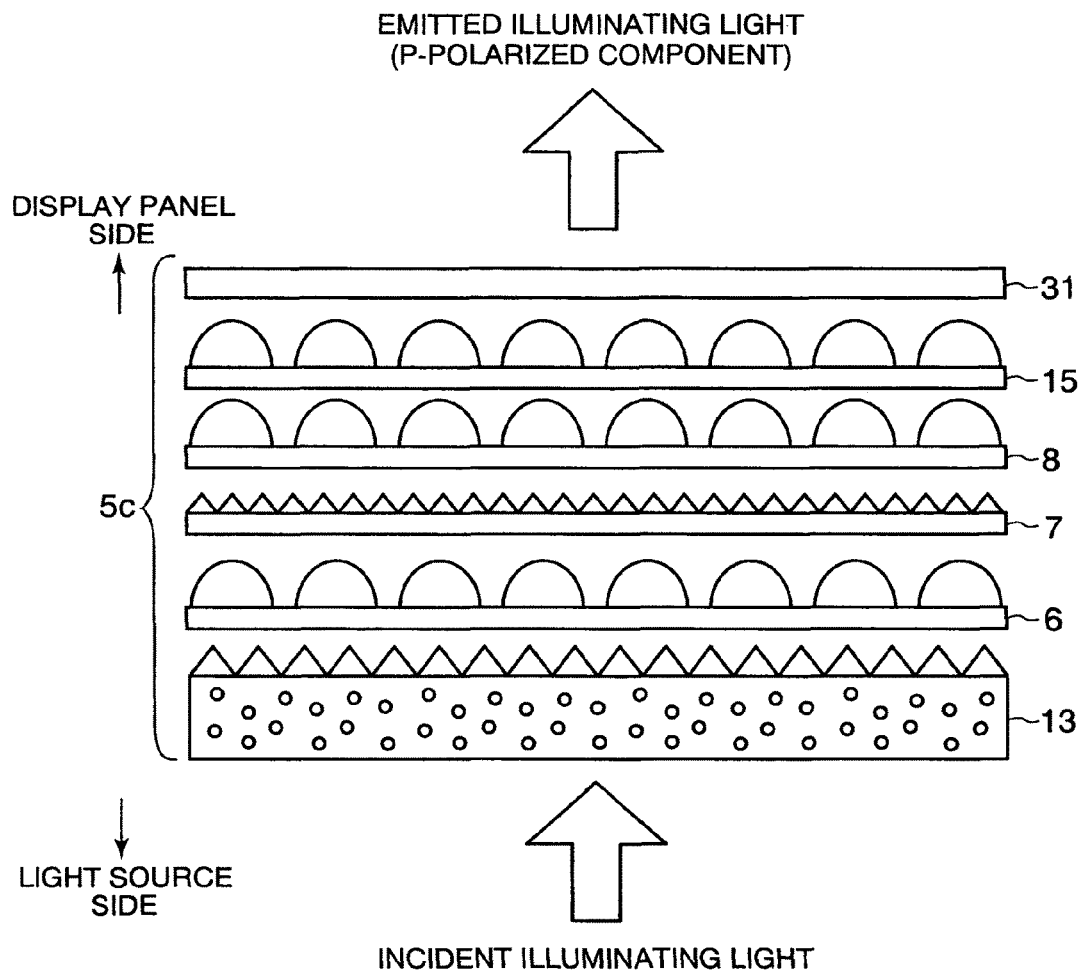
FIG. 8 shows an exploded sectional view of a third embodiment of an optical unit according to the present invention.

The optical unit 5d is equipped with the prism-equipped diffusing plate 13, the first microlens-equipped optical sheet 6, the prism-equipped light collecting sheet 7, the second microlens-equipped optical sheet 8, identical to those of the optical unit 5b (FIG. 6), and the polarization splitting sheet 31 identical to that of the optical unit 5c (FIG. 8).

As discussed above in the second embodiment of the optical unit, although achieving a lower level of luminance non-uniformity, the optical unit 5b could exhibit lower luminance and higher angular dependence of luminance, due to the existence of the prism-equipped diffusing plate 13 and the multiple prisms 12 and 12a as shown in FIGS. 6 and 7.

In order to solve such problems, particularly, to achieve higher luminance of illuminating light that reaches the liquid crystal display panel 2 (FIG. 1), the optical unit 5d is equipped with the polarization splitting sheet 31 in addition to the optical components identical to those of the optical unit 5b.

Figure 15:
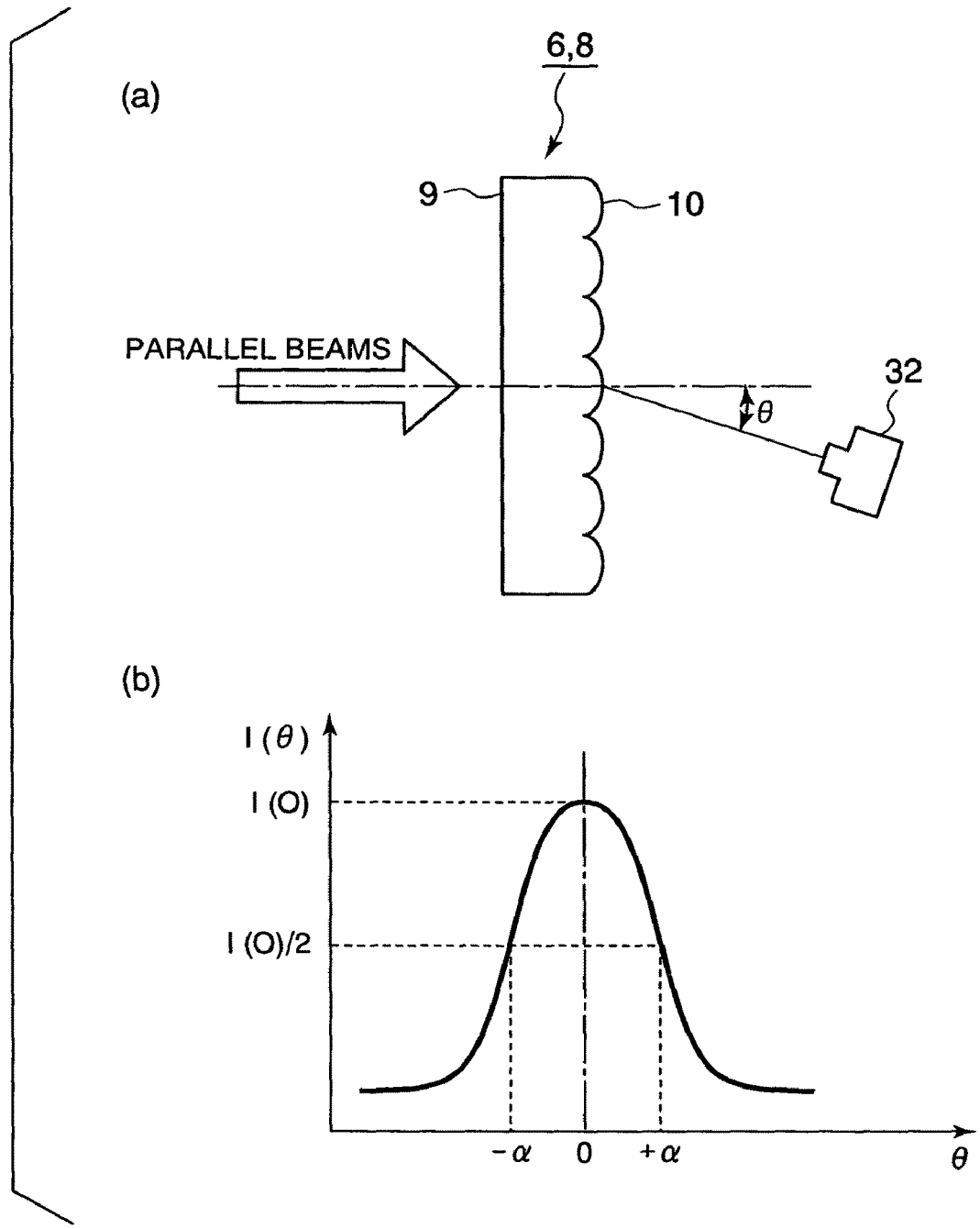
FIG. 15 shows views illustrating examination of a light collecting performance of microlens-equipped optical sheets used in the present invention, in which (a) illustrates a method of the examination and (b) shows a graph indicating luminous intensity depending on the angle of acceptance at a goniophotometer.

Illustrated in (a) of FIG. 15 is the examination of a light collecting performance (photometric distributions) of the first and second microlens-equipped optical sheets 6 and 8, which affects the luminance property and luminance non-uniformity at the liquid crystal display panel 2.

The examination of photometric distributions were performed with a goniophotometer 32 to measure light emitted from the microlenses 10 (FIG. 3) of the microlens-equipped optical sheet 6 (8) while parallel light beams are being incident on the optical sheet 6 (8). The goniophotometer 32 is shifted to several positions each at an angle of $\ominus$ degrees from the center position at an angle of 0 degrees orthogonal to the microlenses 10, to measure the luminous intensity $I(\ominus)$ at each angle of $\ominus$ degrees, as shown in (a) of FIG. 15.

The goniophotometer 32 is an instrument that can set the angle of incidence of light on an object to be measured at any angle and automatically vary the angle of acceptance ⊖ for the light reflecting from or passing through the object, to analyze the intensity distributions of the reflecting or passing light. The instrument used in the measurements was a goniophotometer (GC5000L) made by Nippon Denshoku Kogyo Co. Ltd.

The result of the examination of light collecting performance (photometric distributions) of the microlens-equipped optical sheets 6 and 8 is shown in (b) of FIG. 15 in which the ordinate and abscissa indicate the angle of acceptance ⊖ and luminous intensity I (⊖), respectively.

The curve ⊖-I (⊖) shown in (b) of FIG. 15 represents almost the normal distribution at almost 0 degrees in angle of acceptance ⊖ that gives the maximum luminous intensity I (0) and at half-intensity angles +α and −α each giving a half luminous intensity I (0)/2.

The light collecting performance (photometric distributions) of the microlens-equipped optical sheets 6 and 8 shown in (b) of FIG. 15 will be discussed later.

As, discussed in the third embodiment of the optical unit, the polarization splitting sheet 31 has a function of providing higher luminance with lower angular dependence by selectively reflecting polarized components of the incident illuminating light, which could otherwise be absorbed by a polarization film of the liquid crystal display panel 2 (FIG. 1) located the light source side of the panel 2. Such function can be achieved with the light interference property of the polarization splitting sheet 31.

Figure 16:
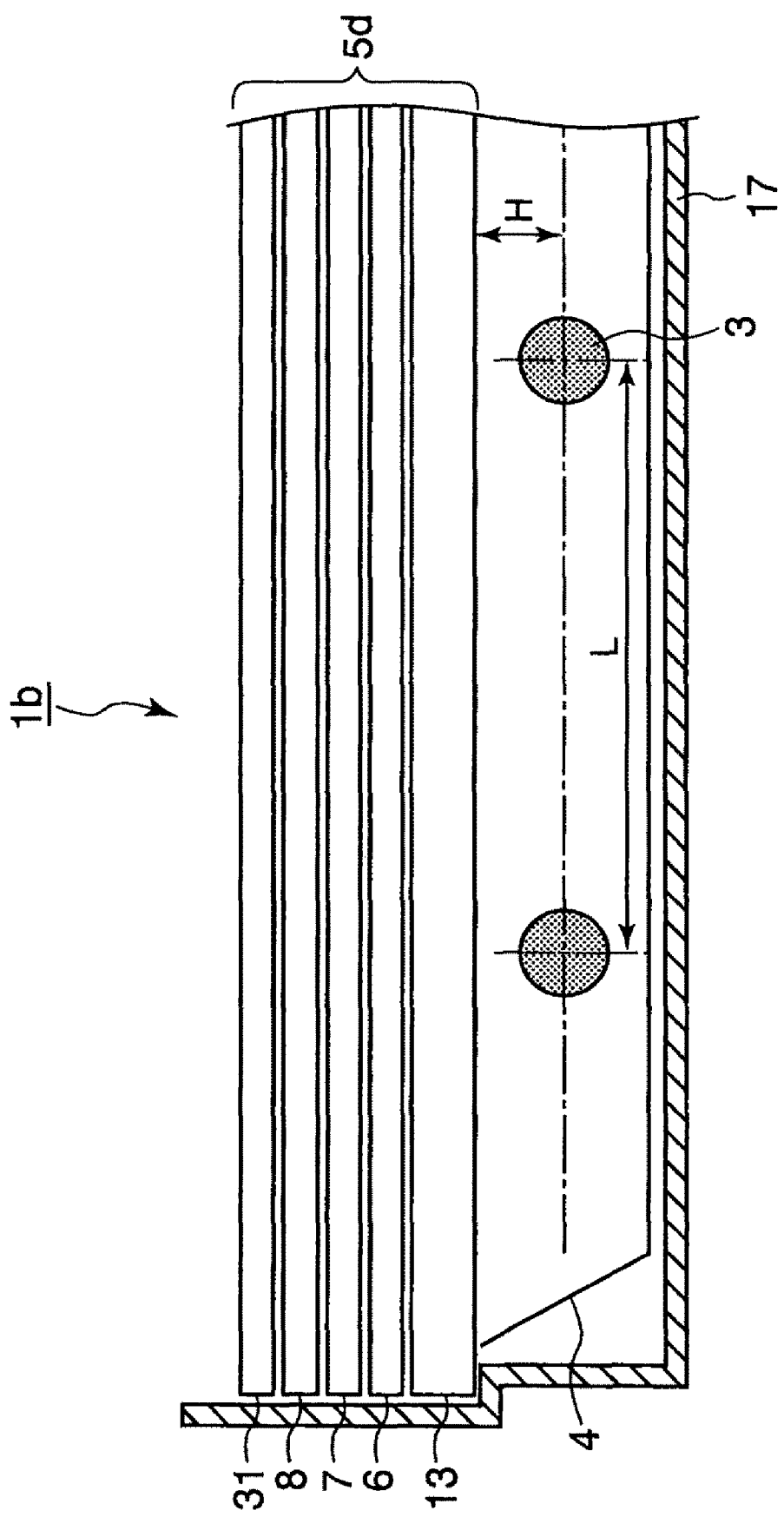
FIG. 16 shows a partial sectional view of a backlight device employing the optical unit shown in FIG. 14, according to the present invention.

Described next is a backlight device 1b that employs the optical unit 5d (the fourth embodiment of the optical unit) with reference to FIG. 16 showing a partial sectional view of the device 1b.

In FIG. 16, the backlight device 1b having a flat rectangular shape is equipped with: the tube-like light sources 3; the optical unit 5d that achieves higher optical performance for the illuminating light emitted from the light sources 3 with a lower level of luminance non-uniformity; the reflecting plate 4 that reflects light components of the illuminating light emitted from the light sources 3, that are emitted in a direction opposite to the optical unit 5d, to make the light components return to the unit 5d; and the metal sheet 17 that supports the tube-like light sources 3, the reflecting plate 4 and the optical unit 5c.

Provided in the backlight device 1b as each tube-like light source 3 is a cold cathode fluorescent lamp that is a compact fluorescent lamp with a smaller diameter of about 3 mm.

The light sources 3 are separated from one another by 24 mm in distance L, each having 5 mm in optical-unit distance H from its center to the bottom surface of the optical unit 5d.

The reflecting plate 4 has a white front face with a flat surface that faces the light sources 3 and side faces formed as being inclined to the optical unit 5d to guide light components emitted in the lateral direction from the light sources 3 to the optical unit 5d.

As described with reference to FIG. 14, the optical unit 5d is equipped with the prism-equipped diffusing plate 13, the first microlens-equipped optical sheet 6, the prism-equipped light collecting sheet 7, the second microlens-equipped optical sheet 8, and the polarization splitting sheet 31, laminated in this order.

The prism-equipped diffusing plate 13 used in the backlight device 1b has a thickness of 2 mm, with multiple prisms having a vertical angle of 100 degrees with a pitch of 70 μm therebetween.

The first and second microlens-equipped optical sheets 6 and 8 used in the backlight device 1b have multiple microlenses, like shown in FIG. 4, with a thickness of 200 μm.

In order to examine the angular dependence of luminance of the backlight device 1b, as discussed later, several optical sheets were prepared as the first and second microlens-equipped optical sheets 6 and 8, with multiple microlenses, like shown in FIG. 4. The multiple microlenses were formed as having different diameters in the range from 40 to 80 μm and different heights in the range from 20 to 40 μm, so that the optical sheets 6 and 8 have a half-intensity angle α within the range from 1 to 30 degrees to give a half luminous intensity I (0)/2, as discussed with reference to FIG. 15.

The prism-equipped diffusing plate 13 used in the backlight device 1b has multiple prisms, each being formed as parallel to the tube-like light sources 3 in the longitudinal direction that is orthogonal to line D-D in (a) of FIG. 7.

The prism-equipped light collecting sheet 7 used in the backlight device 1a have a thickness of 280 μmm, with multiple prisms having a vertical angle of 90 degrees with a pitch of 50 μm therebetween. Each prism of the light collecting sheet 7 is also formed as parallel to the tube-like light sources 3 in the longitudinal direction that is orthogonal to line D-D in (a) of FIG. 7.

Several sample optical sheets were selected with the half-intensity angle α adjusted within the range from 1 to 20 degrees for the first microlens-equipped optical sheet 6 and from 2 to 30 degrees for the second microlens-equipped optical sheet 8, in order to examine the angular dependence of luminance of the backlight device 1b.

Sample backlight devices 1b were assembled with optical units 5b each having optical sheets selected from the sample first and second microlens-equipped optical sheets 6 and 8, and the prism-equipped diffusing plate 13, the prism-equipped light collecting sheet 7, and the polarization splitting sheet 31, described above.

Figure 17:
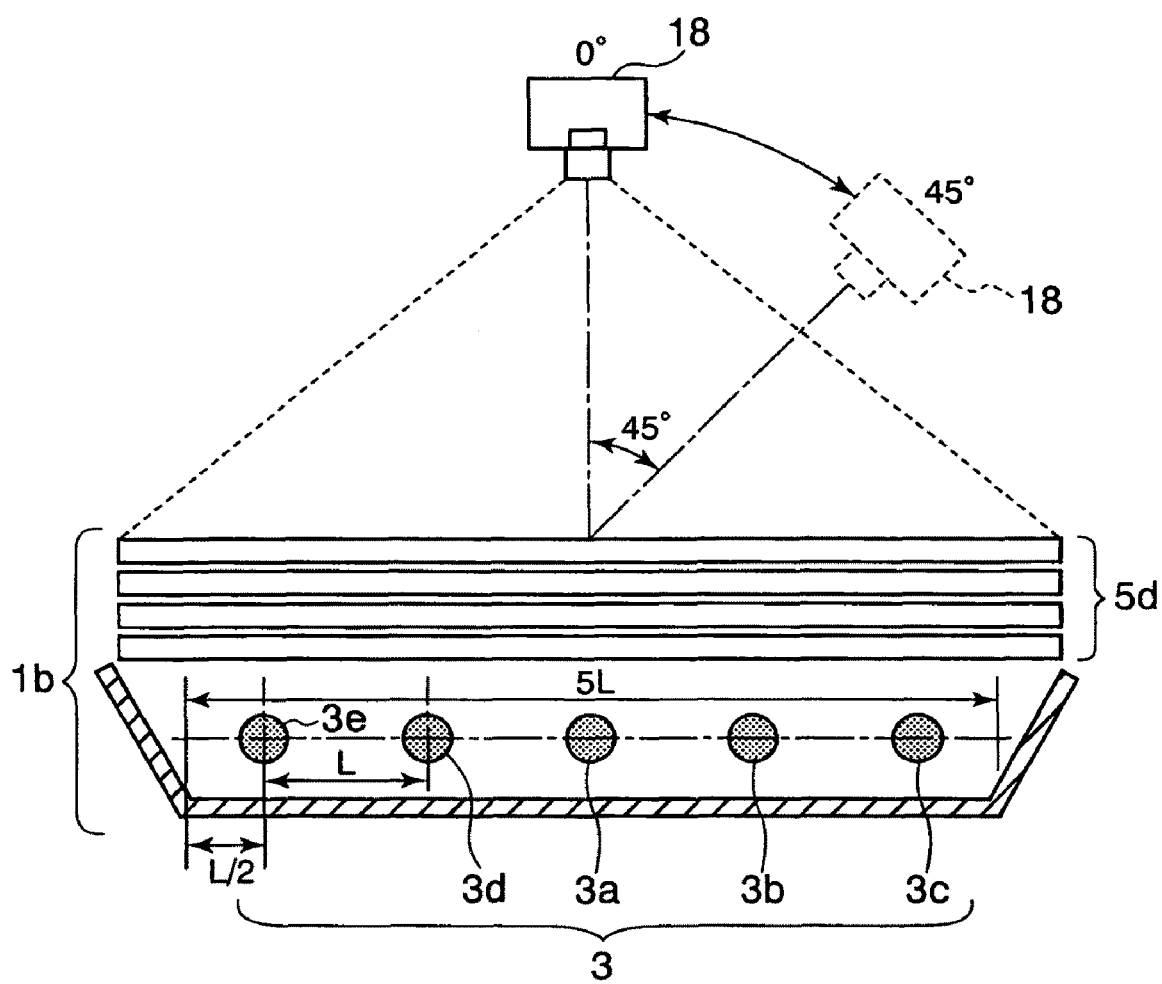
FIG. 17 shows a view illustrating a method of examination of angular dependence of luminance in the backlight device shown in FIG. 16, according to the present invention.

Discussed with reference to FIGS. 17 to 19 are an evaluation method for the sample backlight devices 1b on angular dependence of luminance and results of the evaluation.

The angular dependence of luminance was examined only on the plane of each sample backlight device 1b cut in the transversal direction orthogonal, to the cross section of the tube-like light sources 3, not on the plane in the longitudinal direction parallel to the lamps 3 due to no effects of the luminance non-uniformity in this direction.

The angular dependence of luminance was examined with visual inspection and a method illustrated in FIG. 17.

In FIG. 17, the two-dimensional luminance colorimeter 18 was set in front of the optical unit 5d of each sample backlight device 1b, with an angle of 0 degrees at which the luminance colorimeter 18 was positioned as orthogonal to the light-emitting plane of the sample device 1b.

The angular dependence of luminance was examined with the two-dimensional luminance colorimeter 18 positioned at the angle of 0 degrees and also at the angle of 45 degrees inclined in the transversal direction of each sample backlight device 1b. The visual inspection was also carried out at the angles of 0 and 45 degrees.

The instrument used as the two-dimensional luminance colorimeter 18 was also the ProMetic 1400 made by Radiant Imaging Inc., the same as described with reference to FIG. 10.

Shown in FIG. 18 are the results of evaluation of the sample backlight devices 1b on luminance non-uniformity by visual inspection at the angle of 0 degrees shown in FIG. 17.

The signs "a", "b", "c", "d" and "e" indicate the level of luminance non-uniformity by visual inspection. In detail, the sign "a" indicates a benchmark of luminance non-uniformity examined by visual inspection at the half-intensity angles α of 20 and 8 degrees for the first and second microlens-equipped optical sheets 6 and 8, respectively. The level of luminance non-uniformity becomes lower in the order of the signs "a", "b", "c", "d" and "e" ("a">"b">"c">"d">"e").

FIG. 18 teaches that the luminance non-uniformity depends on the combination of the half-intensity angles α of the first and second microlens-equipped optical sheets 6 and 8. The sample optical sheets 6 and 8 with the combination of the half-intensity angles α at the level of "d" exhibited a lower level of luminance non-uniformity to give a good displaying condition. The luminance non-uniformity was almost not observed by visual inspection at the level of "e". Almost the same results were given by visual inspection at the angle of 45 degrees shown in FIG. 17.

Shown in FIG. 19 are the results of evaluation of the sample backlight devices 1b with several combinations of the half-intensity angles α for the first and second microlens-equipped optical sheets 6 and 8. FIG. 19 shows the level Im of luminance non-uniformity obtained based on the measurements with the two-dimensional luminance calorimeter 18 positioned at the angle of 0 degrees, as illustrated in FIG. 17.

The level Im of luminance non-uniformity is calculated as described below based on the measurements illustrated in FIG. 17.

In FIG. 17, as described above, the two-dimensional luminance calorimeter 18 was set in front of the optical unit 5d of each sample backlight device 1b at the angle of 0 degrees so that the luminance colorimeter 18 could detect light from all of the regions of the tube-like light sources 3, through pixels of a sensor installed in the luminance calorimeter 18.

The output of the sensor of the two-dimensional luminance colorimeter 18 at each pixel line of the sensor corresponds to luminance I(k) for a region 5L/n when the light from a zone 5L that covers five tube-like light sources 3 located at an interval of L, as shown FIG. 17, is detected by the sensor having "n" lines of pixels.

Then, an average luminance Iave of each sample backlight device 1b that is the average of the output from the pixels on all of the pixel lines (k=1 to n) of the sensor of the two-dimensional luminance calorimeter 18 is obtained with the following formula (I):

$$Iave.=\Sigma_{k=1}^{n} I(k)/n \quad (I)$$

Calculated next with the following formula (II) is a dispersed luminance Iv that is the average of the absolute of the difference between the luminance I(k) at each pixel line of the sensor and the average luminance Iave.

$$Iv =\Sigma_{k=1}^{n} |I(k)-Iave.|/n \quad (II)$$

Then, the level Im of luminance non-uniformity is calculated with the following formula (III)

$$Im(\%)=Iv/Iave.\times 100 \quad (III)$$

Practically, the measurements were performed with the two-dimensional luminance colorimeter 18 for the zone 5L that covers five tube-like light sources 3 divided by 330 (the number of pixels of the luminance colorimeter's sensor used in measurements for the zone 5L).

FIGS. 18 and 19 teach that the level of luminance non-uniformity by visual inspection is "d" when the level Im of luminance non-uniformity is lower than 0.6 (the levels shown as surrounded by a dashed line in FIG. 19), favorable results with less luminance non-uniformity. The level Im of luminance non-uniformity lower than 0.6 is obtained with the combination of the first and second microlens-equipped optical sheets 6 and 8 with the half-intensity angles α (discussed with reference to FIG. 15) in the ranges from 2 to 15 and 8 to 25 degrees, respectively.

Moreover, FIGS. 18 and 19 teach that the level of luminance non-uniformity by visual inspection is "e" when the level Im of luminance non-uniformity is lower than 0.5, favorable results with almost no luminance non-uniformity observed. The level Im of luminance non-uniformity lower than 0.5 is obtained with the combination of the first and second microlens-equipped optical sheets 6 and 8 with the half-intensity angles α in range from 2 to 15 and from 10 to 25 degrees, respectively.

The luminance non-uniformity examined with the backlight device 1b of the present invention will be discussed further with respect to FIG. 20.

Figure 20:
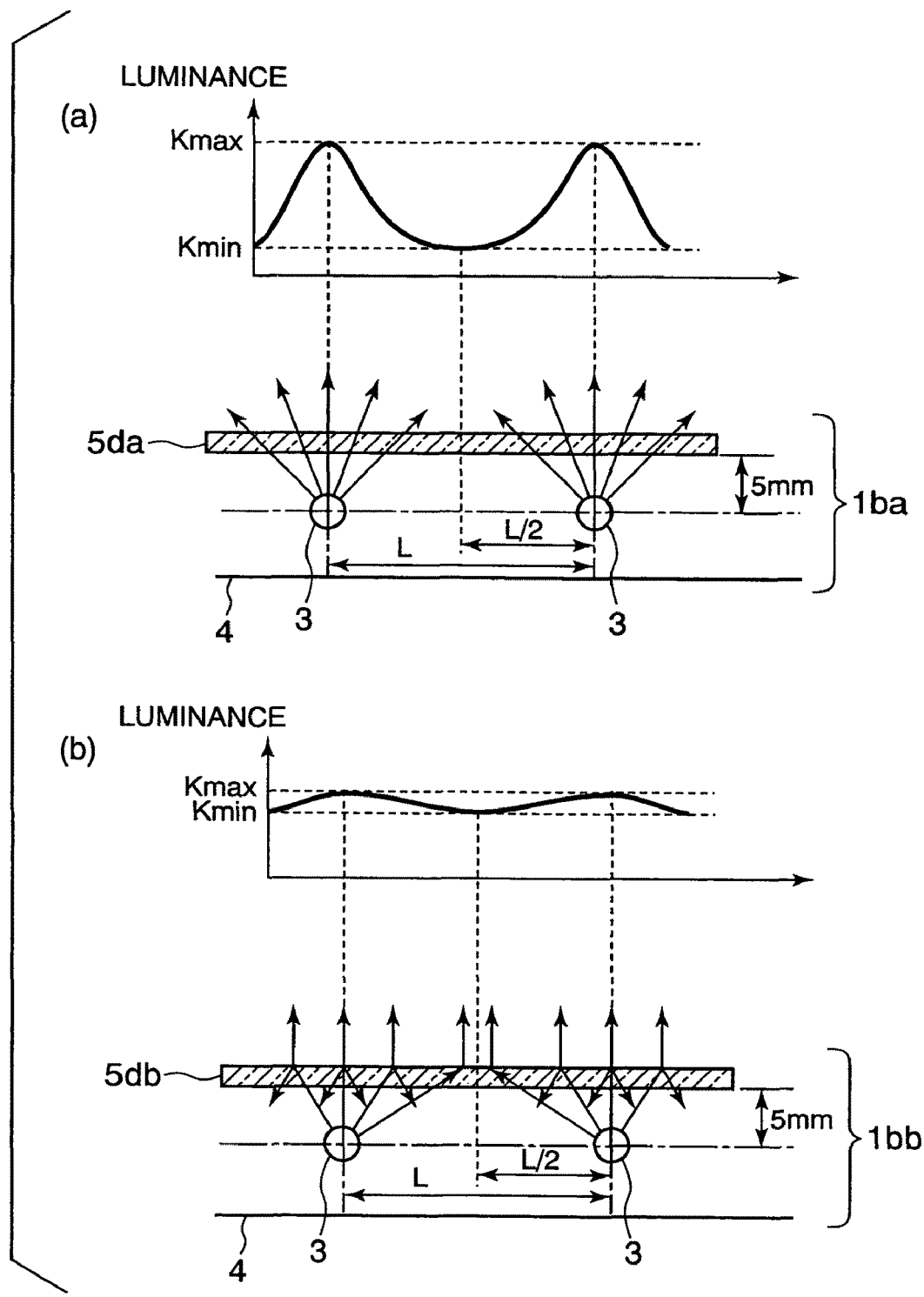
FIG. 20 shows views illustrating luminance non-uniformity, in which (a) and (b) illustrate luminance non-uniformity in the known backlight device and the backlight device shown in FIG. 16 of the present invention, respectively.

Illustrated in (a) and (b) of FIG. 20 are typical luminance non-uniformity exhibited by sample backlight devices 1ba and 1bb assembled so that they gave the level Im of luminance non-uniformity equal to or higher than 0.6 (high level of unevenness) and lower than 0.6 (low level of unevenness), respectively, at the angle of 0 degrees at which the two-dimensional luminance colorimeter 18 was set in front of the backlight devices 1ba and 1bb.

In detail, illustrated in (a) of FIG. 20 is typical luminance non-uniformity exhibited by the sample backlight device 1ba with an optical unit 5da assembled so that it gave the level Im of luminance non-uniformity equal to or higher than 0.6 (a high level of unevenness) at the angle of 0 degrees at which the two-dimensional luminance calorimeter 18 was set in front of the sample device 1ba.

Illustrated in (b) of FIG. 20 is also typical luminance non-uniformity exhibited by the sample backlight device 1bb with an optical unit 5db assembled so that it gave the level Im of luminance non-uniformity lower than 0.6 (a low level of unevenness) at the same angle of 0 degrees as for the sample device 1bb.

In FIG. 20, the maximum and minimum luminance (Kmax) and (Kmin) of illuminating light were measured at the positions just above (in front of) each tube-like light source 3 and corresponding to the center position of 12 mm (L/2) between the two adjacent light sources 3, respectively.

FIG. 20 shows that the sample backlight device 1bb exhibits a lower level of luminance non-uniformity (Kmax-Kmin) compared to the sample backlight device 1ba.

Moreover, FIG. 20 shows that the sample backlight device 1bb exhibited a lower luminance level than the sample backlight device 1ba, due to reflection, diffusion, etc., at the positions just above (in front of) each tube-like light source 3.

It is taught that the sample backlight device 1bb suffers a lower maximum luminance level than the sample backlight device 1ba at each position just in above (in front of) the associated tube-like light source 3, due to almost no reflection of illuminating light of the light source 3 at the position for the sample device 1bb.

Also taught is that, although suffering a lower luminance level at each position discussed above, the sample backlight device 1bb enjoys a higher utility of light (emitted light/incident light) reflected at the optical unit 5db than the sample backlight device 1ba, as the position becomes closer to the center position between the two adjacent tube-like light sources 3.

It is therefore understood that the sample backlight device 1bb with the combination of the microlens-equipped optical sheets 6 and 8 adjusted as having the half-intensity angles α in the ranges from 2 to 15 and 8 to 25 degrees for the optical sheets 6 and 8, respectively, exhibits a lower level of luminance non-uniformity than the sample backlight device 1ba for which the half-intensity angles α are out of the ranges.

Figure 21:
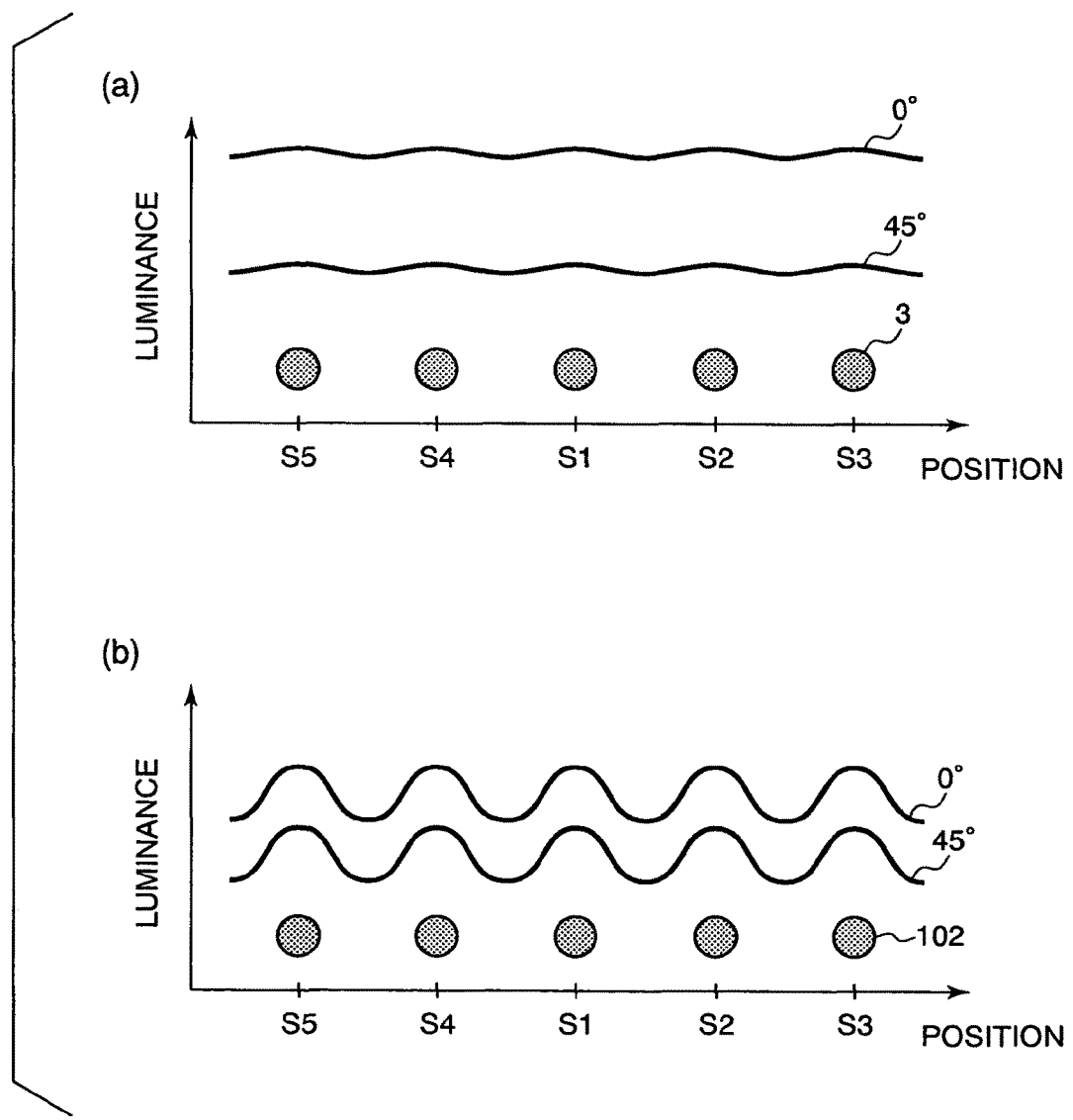
FIG. 21 shows graphs indicating angular dependency of luminance, in which (a) and (b) indicate angular dependency of luminance in the backlight device shown in FIG. 16 of the present invention and the known backlight device, respectively.

Discussed further with respect to FIG. 21 is the angular dependency of luminance.

Shown in (a) and (b) of FIG. 21 are the luminance distribution exhibited by the sample backlight device 1bb (H=5 mm and Im<0.6) and the sample backlight device 1ba (H=5 mm and Im>0.6), respectively, measured by the two-dimensional luminance colorimeter 18 positioned at the angles of 0 and 45 degrees as shown in FIG. 17.

The ordinates in (a) of FIG. 21 indicates the positions of planes of the sample backlight device 1bb cut in the transversal direction that is orthogonal to the light sources 3, with a point S1 corresponding to the position of the light source 3a with which the two-dimensional luminance calorimeter 18 faces at the angle of 0 degrees and points S2, S3, S4 and S5 corresponding to the positions of the light sources 3b, 3c, 3d and 3e, respectively, shown in FIG. 17. The abscissa in (a) of FIG. 21 indicates luminance measured by the luminance colorimeter 18. The same is applied to the ordinate and abscissa in (b) of FIG. 21.

FIG. 21 teaches that: the sample backlight device 1bb exhibited a lower level of luminance non-uniformity at both of the angles of 0 and 45 degrees; whereas the sample backlight device 1ba exhibited a higher level of luminance non-uniformity at both of the angles of 0 and 45 degrees due to the combination of the microlens-equipped optical sheets 6 and 8 adjusted as having the half-intensity angles α out of the ranges from 2 to 15 and 8 to 25 degrees, respectively, even though the optical-unit distance H was adjusted as shorter than the known backlight device 101.

Described next are a liquid crystal module and a liquid crystal display apparatus, employing the backlight device 1 (FIG. 1) of the present invention.

Figure 22:
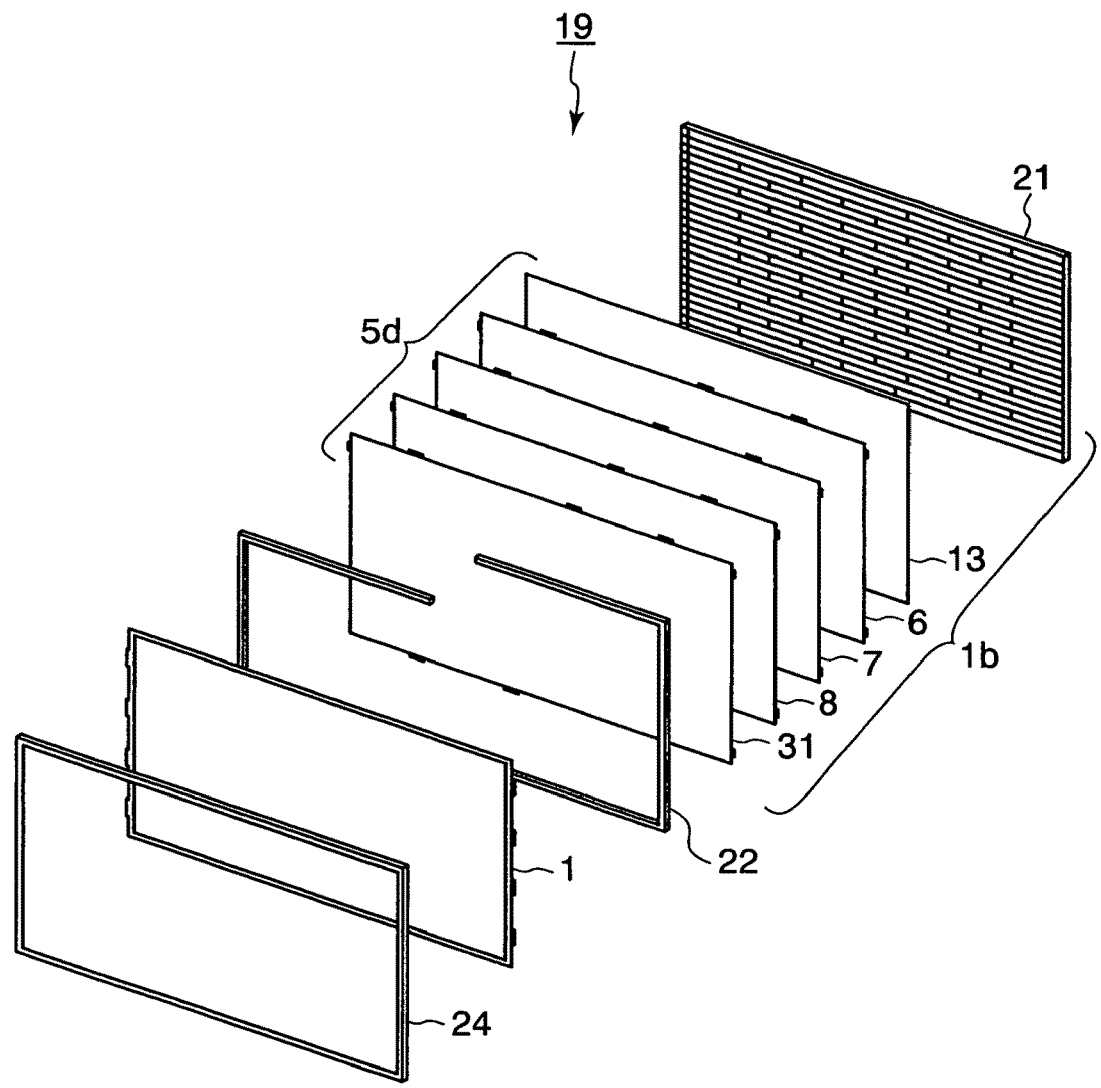
FIG. 22 shows a perspective developed view of a liquid crystal module employing the optical unit shown in FIG. 14, according to the present invention.

FIG. 22 shows a perspective developed view of a liquid crystal module 19 employing the optical unit 5d, the fourth embodiment of the optical unit according to the present invention.

As shown in FIG. 22, the liquid crystal module 19 is constituted by: a backlight assembly 21 in which the light sources 3, the reflecting plate 4, and the metal sheet 17, such as shown in FIG. 16, are installed; the optical unit 5d attached to the backlight assembly 21; a panel chassis 22 to hold the optical unit 5d; the liquid crystal panel 2 (FIG. 1); and a rectangular bezel 24 to hold the liquid crystal panel 23, assembled in this order.

Instead of the optical unit 5d, the optical units 5a to 5c, the first to third embodiments of the optical unit according to the present invention can be selectively employed in the liquid crystal module 19.

Figure 23:
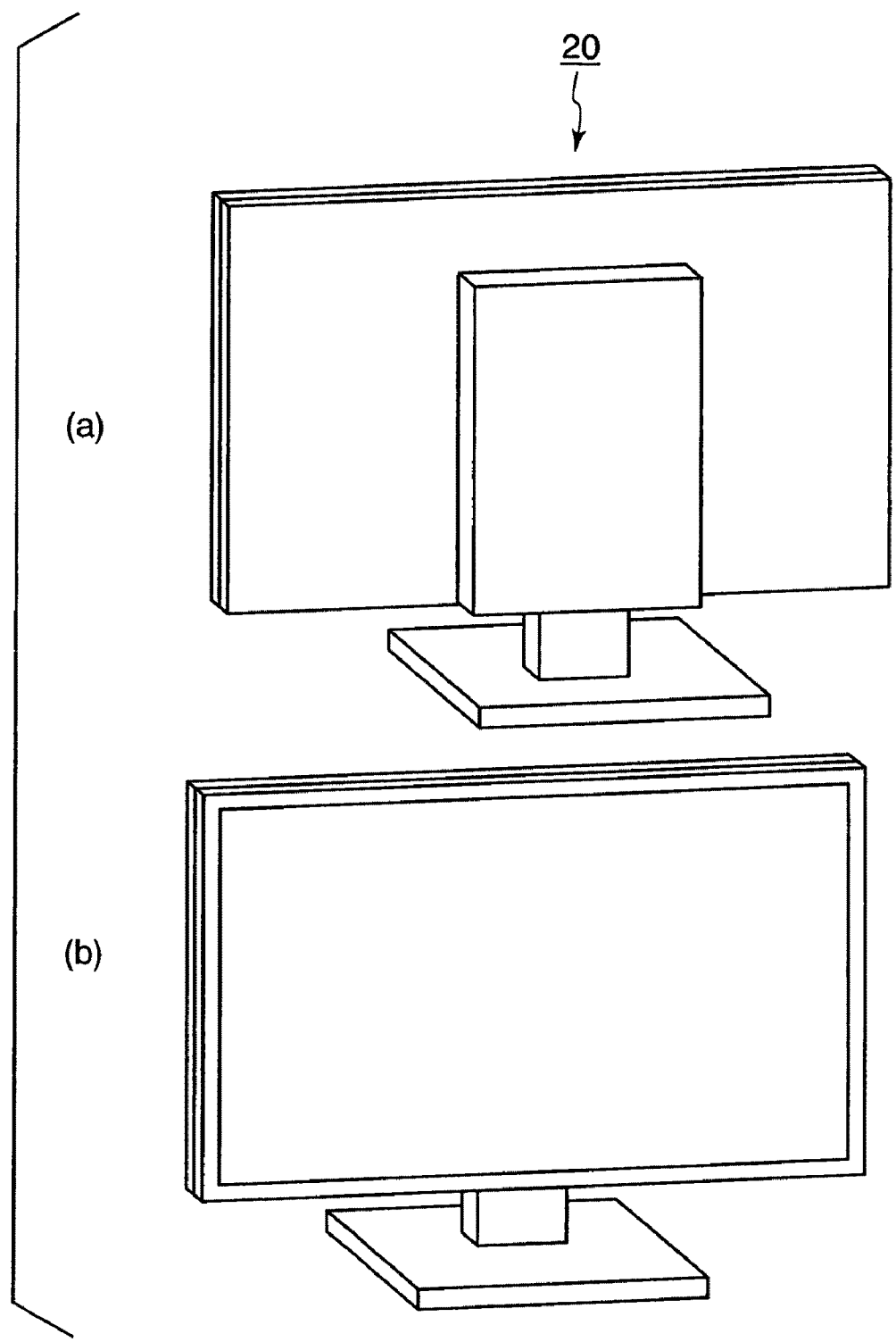
FIG. 23 shows views of a liquid crystal display apparatus employing the backlight device of the present invention, in which (a) and (b) show the rear and front sides, respectively, of the display apparatus.

FIG. 23 shows perspective views of a liquid crystal display apparatus 20 employing the backlight device 1 of the present invention, assembled with circuitry, such as a driver for the liquid crystal panel 2, input and output terminals, etc., attached to the liquid crystal module 19, and installed in a frame.

Figure 24:
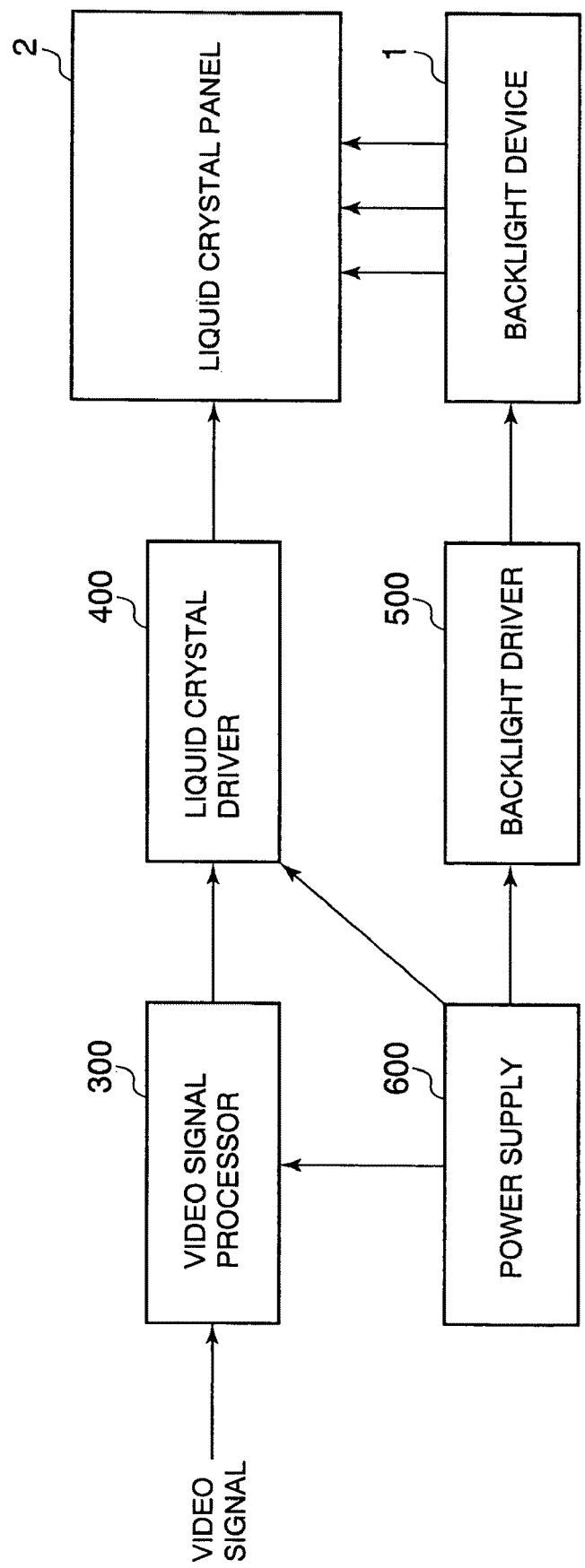
FIG. 24 shows a block diagram of the liquid crystal display apparatus shown in FIG. 23, according to the present invention.

Also shown in FIG. 24 is a block diagram of the liquid crystal display apparatus 20, equipped with a video signal processor 300, a liquid crystal driver 400, a backlight driver 500, and a power supply 600, for driving the backlight device 1 and the liquid crystal display panel 2.

The video signal processor 300 receives a video signal supplied from external circuitry, such as a tuner, and processes the video signal to generate R, G and B signals that carry video data to be displayed on the liquid crystal display panel 2.

The liquid crystal driver 400 is equipped with a source driver, a gate driver, and a timing controller, although not shown in FIG. 24 for brevity.

When the R, G and B signals are supplied to the liquid crystal driver 400, the source driver supplies a voltage to the liquid crystal of a pixel to be driven on the liquid crystal display panel 2, based on the R, G and B signals, at a specific timing under control by the timing controller, the pixels on each line being driven by a scanning signal supplied from the gate driver to the associated gate line on the panel 2.

When the backlight device 1 employs a cold cathode fluorescent lamp for each light source 3 (FIG. 1), the backlight driver 500 converts a power supply voltage supplied by the power supply 600 into an alternating voltage, with an inverter installed in the driver 500, and supplies the alternating voltage to the backlight device 1.

Figure 25:
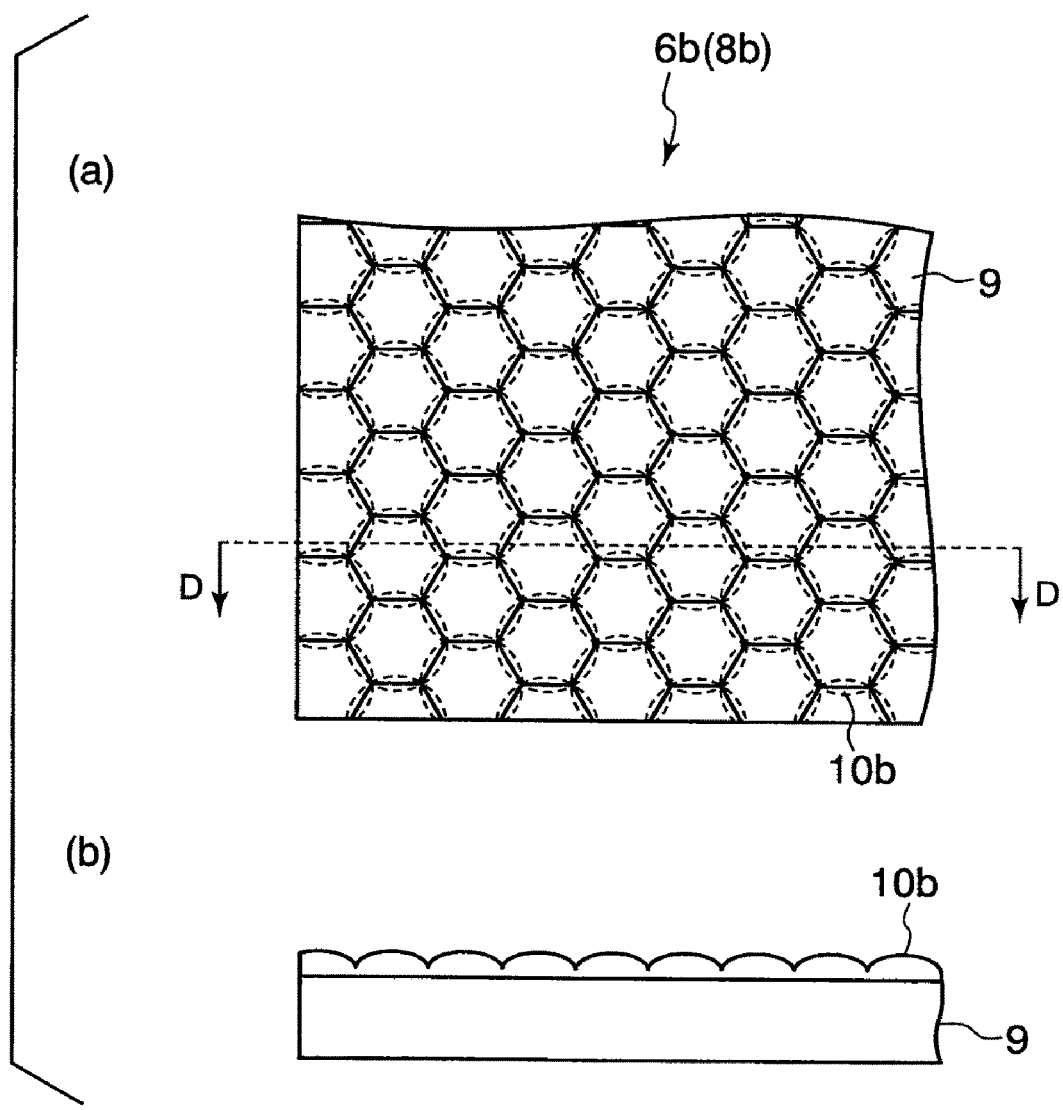
FIG. 25 shows a modification to the microlens-equipped optical sheet shown in FIG. 3, in which (a) shows a partial plan view of the modified optical sheet and (b) shows a partial sectional view of the modified optical sheet, taken on line D-D in (a)

Shown in FIG. 25 is a further preferable arrangement of the microlenses of the first and second microlens-equipped optical sheets 6 and 8.

As shown in (a) of FIG. 25, microlens-equipped optical sheets 6b and 8b have regular hexagonal microlenses 10b arranged in a honeycomb pattern when viewed from the light-emitting side of the microlenses 10b. The microlenses 10b tightly arranged with almost no spaces through which the sheet base 9 is exposed on the light-emitting side, different from those shown in (a) of FIGS. 3 and 4, allow a quite few amount of incident light to travel straight, thus having an excellent light collecting function.

As described in detail, the present invention achieves a lower level of luminance non-uniformity with almost no lowered luminance in the direction orthogonal to a backlight device and also oblique directions, even if the liquid crystal display apparatus is adjusted to be a thinner apparatus with the optical-unit distance H of 5 mm shorter than the known distance H of 15 mm, with no increase in the number of the tube-like light sources which leads to no needs to increase in the number of inverters in a backlight driver, thus achieving low power consumption and high cost performance.

What is claimed is:

1. An optical unit for use in a backlight device of a liquid crystal display apparatus, comprising:
    a first light-collecting and -diffusing optical component having a surface provided on which are a plurality of microlenses each having a shape of a hemisphere- or semi-oval-like protrusion, having light collecting and diffusing functions;
    a light-collecting optical component having a surface provided on which are a plurality of prisms each having a saw-teeth like section, having a light collecting function; and
    a second light-collecting and -diffusing optical component having a surface provided on which are a plurality of microlenses each having a shape of a hemisphere- or semi-oval-like protrusion, having light collecting and diffusing functions,
    wherein the first light-collecting and -diffusing optical component, the light-collecting optical component, and the second light-collecting and -diffusing optical component are provided in this order on an optical path of light emitted from a light source of the backlight device, each surface being provided on a light-emitting side of the optical unit.

2. The optical unit according to claim 1 further comprising a light-diffusing and -collecting optical component having a surface provided on which are a plurality of prisms each having a saw-teeth like section, having a light diffusing and collecting function, the light- diffusing and -collecting optical component being provided between the light source and the first light-collecting and -diffusing optical component.

3. The optical unit according to claim 2 further comprising a polarization splitting optical component having functions of splitting incident light into a first type of linearly polarized light and a second type of linearly polarized light, allowing the first type of linearly polarized light to pass therethrough, and reflecting the second type of linearly polarized light, the polarization splitting optical component being provided over the second light-collecting and -diffusing optical component at the light-emitting side of the optical unit.

4. The optical unit according to claim 3 further comprising a third light-collecting and -diffusing optical component having a surface provided on which are a plurality of microlenses each having a shape of a hemisphere- or semi-oval-like protrusion, having light collecting and diffusing functions, the third light-collecting and -diffusing, optical component being provided between the second light-collecting and -diffusing optical component and the polarization splitting optical component, the surface of the third light-collecting and -diffusing optical component being provided on the light-emitting side of the optical unit.

5. The optical unit according to claim 2 wherein the first light-collecting and -diffusing optical component has a half-intensity angle in a range from 2 degrees to 15 degrees and the second light-collecting and -diffusing optical component has a half-intensity angle in a range from 8 degrees to 25 degrees, light emitting from each of the first and second light-collecting and -diffusing optical components exhibiting a specific luminance at the half-intensity angle, intensity of the specific luminance being half of maximum luminance intensity of light emitted from each of the first and second light-collecting and -diffusing optical components at 0 degrees.

6. The optical unit according to claim 1 wherein the microlenses of each of the first and second light-collecting and -diffusing optical components are arranged on the surface in a grid pattern in which imaginary lines connected to summits of each set of three microlenses form an equilateral triangle.

7. The optical unit according to claim 1 wherein the microlenses of each of the first and second light-collecting and -diffusing optical components are arranged on the surface in a grid pattern in which the microlenses have different diameters when viewed from the light-emitting side of the optical unit.

8. The optical unit according to claim 1 wherein the microlenses of each of the first and second light-collecting and -diffusing optical components are arranged on the surface in a honeycomb pattern in which the microlenses are tightly arranged with almost no spaces for light to travel.

9. A backlight device comprising:
an optical unit;
a light source; and
a reflecting plate that is provided so that the light source is located between the optical unit and the reflecting plate,
wherein the optical unit includes:
a first light-collecting and -diffusing optical component having a surface provided on which are a plurality of microlenses each having a shape of a hemisphere- or semi-oval-like protrusion, having light collecting and diffusing functions;
a light-collecting optical component having a surface provided on which are a plurality of prisms each having a saw-teeth like section, having a light collecting function; and
a second light-collecting and -diffusing optical component having a surface provided on which are a plurality of microlenses each having a shape of a hemisphere- or semi-oval-like protrusion, having light collecting and diffusing functions,
wherein the first light-collecting and -diffusing optical component, the light-collecting optical component, and the second light-collecting and -diffusing optical component are provided in this order on an optical path of light emitted from the light source, each surface being provided on a light-emitting side of the optical unit.

10. A liquid crystal module comprising:
a liquid crystal panel; and
a backlight device including:
an optical unit;
a light source; and
a reflecting plate that is provided so that the light source is located between the optical unit and the reflecting plate,
wherein the optical unit includes:
a first light-collecting and -diffusing optical component having a surface provided on which are a plurality of microlenses each having a shape of a hemisphere- or semi-oval-like protrusion, having light collecting and diffusing functions;
a light-collecting optical component having a surface provided on which are a plurality of prisms each having a saw-teeth like section, having a light collecting function; and
a second light-collecting and -diffusing optical component having a surface provided on which are a plurality of microlenses each having a shape of a hemisphere- or semi-oval-like protrusion, having light collecting and diffusing functions,
wherein the first light-collecting and -diffusing optical component, the light-collecting optical component, and the second light-collecting and -diffusing optical component are provided in this order on an optical path of light emitted from the light source, each surface being provided on a light-emitting side of the optical unit, and
the liquid crystal panel is provided so that the optical unit is located between the light source and the liquid crystal panel.

11. A liquid crystal display apparatus comprising:
a liquid crystal module; and
a driver for driving the liquid crystal module,
wherein the liquid crystal module includes a liquid crystal panel and a backlight device having:
an optical unit;
a light source; and
a reflecting plate that is provided so that the light source is located between the optical unit and the reflecting plate,
wherein the optical unit includes:
a first light-collecting and -diffusing optical component having a surface provided on which are a plurality of microlenses each having a shape of a hemisphere- or semi-oval-like protrusion, having light collecting and diffusing functions;
a light-collecting optical component having a surface provided on which are a plurality of prisms each having a saw-teeth like section, having a light collecting function; and
a second light-collecting and -diffusing optical component having a surface provided on which are a plurality of microlenses each having a shape of a hemisphere- or semi-oval-like protrusion, having light collecting and diffusing functions,
wherein the first light-collecting and -diffusing optical component, the light-collecting optical component, and the second light-collecting and -diffusing optical component are provided in this order on an optical path of light emitted from the light source, each surface being provided on a light-emitting side of the optical unit, and
the liquid crystal panel is provided so that the optical unit is located between the light source and the liquid crystal panel.

* * * * *